(12) United States Patent
Matsuzaki

(10) Patent No.: US 10,733,487 B2
(45) Date of Patent: Aug. 4, 2020

(54) INFORMATION PROCESSING APPARATUS THAT GENERATES COLOR CONVERSION TABLE TO BE SET IN IMAGE FORMING APPARATUS, INFORMATION PROCESSING METHOD, AND STORAGE MEDIUM

(71) Applicant: CANON KABUSHIKI KAISHA, Tokyo (JP)

(72) Inventor: Masanori Matsuzaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/155,191

(22) Filed: Oct. 9, 2018

(65) Prior Publication Data

US 2019/0114518 A1    Apr. 18, 2019

(30) Foreign Application Priority Data

Oct. 17, 2017 (JP) ................................ 2017-201421
Aug. 22, 2018 (JP) ................................ 2018-155609

(51) Int. Cl.
    *H04N 1/60*        (2006.01)
    *G06K 15/02*       (2006.01)

(52) U.S. Cl.
    CPC ....... *G06K 15/1878* (2013.01); *H04N 1/6058* (2013.01)

(58) Field of Classification Search
    CPC .................... G06K 15/1878; G06F 3/1245
    USPC ................. 358/3.23, 3.27, 504, 518, 520
    See application file for complete search history.

(56) References Cited

U.S. PATENT DOCUMENTS

| 7,773,252 | B2 * | 8/2010 | Yoshida | ............... | H04N 1/6033 |
| | | | | | 358/1.9 |
| 2005/0099431 | A1 * | 5/2005 | Herbert | ..................... | G06F 3/14 |
| | | | | | 345/601 |
| 2006/0245016 | A1 * | 11/2006 | Fukao | .................. | H04N 1/6025 |
| | | | | | 358/518 |
| 2007/0052987 | A1 * | 3/2007 | Jung | ..................... | H04N 1/6011 |
| | | | | | 358/1.9 |
| 2009/0086223 | A1 * | 4/2009 | Mahy | ................... | H04N 1/6019 |
| | | | | | 358/1.9 |
| 2011/0268356 | A1 * | 11/2011 | Tsukada | ..................... | G06T 1/00 |
| | | | | | 382/167 |

FOREIGN PATENT DOCUMENTS

JP    5943666 B2    7/2016

\* cited by examiner

*Primary Examiner* — Jamares Q Washington
(74) *Attorney, Agent, or Firm* — Canon U.S.A., Inc. IP Division

(57) ABSTRACT

An information processing apparatus that generates a color conversion table to be set in an image forming apparatus includes a conversion unit that uses a color conversion table to convert input RGB values into output RGB values, wherein the color conversion table is a conversion table for conversion of the input RGB values into output RGB values that depend on a color gamut of the image forming apparatus, an extraction unit that extracts an L value indicating lightness out of a plurality of elements forming Lab values corresponding to the output RGB values, a correction unit that corrects the extracted L value, and a correction unit that uses the corrected L value, and a and b values indicating chromaticity and other than the extracted L value out of the plurality of elements forming the Lab values corresponding to the output RGB values to correct the color conversion table.

6 Claims, 21 Drawing Sheets

| INPUT SIGNAL VALUES | | | OUTPUT SIGNAL VALUES | | |
|---|---|---|---|---|---|
| R | G | B | R | G | B |
| 0 | 0 | 0 | 0 | 0 | 0 |
| 0 | 0 | 17 | 3 | 10 | 20 |
| 0 | 0 | 34 | 3 | 10 | 45 |
| ⋮ | ⋮ | ⋮ | ⋮ | ⋮ | ⋮ |
| 170 | 0 | 0 | 180 | 10 | 5 |
| 170 | 0 | 17 | 180 | 10 | 20 |
| ⋮ | ⋮ | ⋮ | ⋮ | ⋮ | ⋮ |
| 221 | 170 | 34 | 210 | 160 | 40 |
| 221 | 170 | 51 | 210 | 160 | 45 |
| ⋮ | ⋮ | ⋮ | ⋮ | ⋮ | ⋮ |
| 255 | 255 | 238 | 245 | 245 | 228 |
| 255 | 255 | 255 | 255 | 255 | 255 |

1102

| INPUT SIGNAL VALUES | | | OUTPUT SIGNAL VALUES | | | |
|---|---|---|---|---|---|---|
| R | G | B | C | M | Y | K |
| 0 | 0 | 0 | 100 | 100 | 100 | 255 |
| 0 | 0 | 17 | 120 | 100 | 100 | 220 |
| 0 | 0 | 34 | 140 | 100 | 100 | 200 |
| ⋮ | ⋮ | ⋮ | ⋮ | ⋮ | ⋮ | ⋮ |
| 170 | 0 | 0 | 100 | 200 | 200 | 0 |
| 170 | 0 | 17 | 90 | 200 | 200 | 0 |
| ⋮ | ⋮ | ⋮ | ⋮ | ⋮ | ⋮ | ⋮ |
| 221 | 170 | 34 | 60 | 120 | 240 | 0 |
| 221 | 170 | 51 | 60 | 120 | 230 | 0 |
| ⋮ | ⋮ | ⋮ | ⋮ | ⋮ | ⋮ | ⋮ |
| 255 | 255 | 238 | 0 | 0 | 30 | 0 |
| 255 | 255 | 255 | 0 | 0 | 0 | 0 |

1103

| INPUT SIGNAL VALUES | | | OUTPUT SIGNAL VALUES | | |
|---|---|---|---|---|---|
| R | G | B | L | a | b |
| 0 | 0 | 0 | 20 | 0 | 0 |
| 0 | 0 | 17 | 25 | 0 | -5 |
| 0 | 0 | 34 | 30 | 0 | -10 |
| ⋮ | ⋮ | ⋮ | ⋮ | ⋮ | ⋮ |
| 170 | 0 | 0 | 60 | 30 | 10 |
| 170 | 0 | 17 | 65 | 30 | 5 |
| ⋮ | ⋮ | ⋮ | ⋮ | ⋮ | ⋮ |
| 221 | 170 | 34 | 80 | 10 | 30 |
| 221 | 170 | 51 | 80 | 10 | 25 |
| ⋮ | ⋮ | ⋮ | ⋮ | ⋮ | ⋮ |
| 255 | 255 | 238 | 85 | 0 | 8 |
| 255 | 255 | 255 | 90 | 0 | 0 |

1104

| INPUT SIGNAL VALUES | | | OUTPUT SIGNAL VALUES |
|---|---|---|---|
| R | G | B | L |
| 0 | 0 | 0 | 20 |
| 0 | 0 | 17 | 25 |
| 0 | 0 | 34 | 30 |
| ⋮ | ⋮ | ⋮ | ⋮ |
| 170 | 0 | 0 | 60 |
| 170 | 0 | 17 | 65 |
| ⋮ | ⋮ | ⋮ | ⋮ |
| 221 | 170 | 34 | 80 |
| 221 | 170 | 51 | 80 |
| ⋮ | ⋮ | ⋮ | ⋮ |
| 255 | 255 | 238 | 85 |
| 255 | 255 | 255 | 90 |

1105

| INPUT SIGNAL VALUES | | | OUTPUT SIGNAL VALUES | |
|---|---|---|---|---|
| R | G | B | a | b |
| 0 | 0 | 0 | 0 | 0 |
| 0 | 0 | 17 | 0 | -10 |
| 0 | 0 | 34 | 0 | -20 |
| ⋮ | ⋮ | ⋮ | ⋮ | ⋮ |
| 170 | 0 | 0 | 30 | 10 |
| 170 | 0 | 17 | 30 | 5 |
| ⋮ | ⋮ | ⋮ | ⋮ | ⋮ |
| 221 | 170 | 34 | 10 | 30 |
| 221 | 170 | 51 | 10 | 25 |
| ⋮ | ⋮ | ⋮ | ⋮ | ⋮ |
| 255 | 255 | 238 | 0 | 8 |
| 255 | 255 | 255 | 0 | 0 |

FIG.16

SIGNAL VALUES OF sRGB IMAGE

| R | G | B |
|---|---|---|
| 0 | 0 | 0 |
| 0 | 0 | 17 |
| 0 | 0 | 34 |
| ⋮ | ⋮ | ⋮ |
| 255 | 255 | 102 |
| 255 | 255 | 119 |
| ⋮ | ⋮ | ⋮ |
| 255 | 255 | 255 |

1601

SIGNAL VALUES AFTER COLOR CONVERSION/COLOR SEPARATION PROCESSING

| C | M | Y | K |
|---|---|---|---|
| 100 | 100 | 100 | 255 |
| 120 | 100 | 100 | 220 |
| 140 | 100 | 100 | 200 |
| ⋮ | ⋮ | ⋮ | ⋮ |
| 0 | 0 | 180 | 0 |
| 0 | 0 | 160 | 0 |
| ⋮ | ⋮ | ⋮ | ⋮ |
| 0 | 0 | 0 | 0 |

1602

1603

SIGNAL VALUES AFTER COLOR CONVERSION/COLOR SEPARATION PROCESSING

| C | M | Y | K |
|---|---|---|---|
| 100 | 100 | 100 | 255 |
| 120 | 100 | 100 | 220 |
| 140 | 100 | 100 | 200 |
| ⋮ | ⋮ | ⋮ | ⋮ |
| 10 | 0 | 180 | 0 |
| 8 | 0 | 160 | 0 |
| ⋮ | ⋮ | ⋮ | ⋮ |
| 0 | 0 | 0 | 0 |

| INPUT VALUES | | | OUTPUT VALUES | | | PURE COLOR INFORMATION |
|---|---|---|---|---|---|---|
| R | G | B | R | G | B | |
| 0 | 0 | 0 | 0 | 0 | 0 | NON-PURE COLOR |
| ⋮ | ⋮ | ⋮ | ⋮ | ⋮ | ⋮ | ⋮ |
| 170 | 17 | 0 | 180 | 10 | 5 | NON-PURE COLOR |
| 170 | 17 | 17 | 180 | 10 | 20 | NON-PURE COLOR |
| ⋮ | ⋮ | ⋮ | ⋮ | ⋮ | ⋮ | ⋮ |
| 255 | 255 | 102 | 245 | 245 | 90 | PURE COLOR |
| 255 | 255 | 119 | 245 | 245 | 110 | PURE COLOR |
| ⋮ | ⋮ | ⋮ | ⋮ | ⋮ | ⋮ | ⋮ |
| 255 | 255 | 255 | 255 | 255 | 255 | NON-PURE COLOR |

| INPUT VALUES | | | OUTPUT VALUES | | | PURE COLOR INFORMATION | THRESHOLD VALUE |
|---|---|---|---|---|---|---|---|
| R | G | B | R | G | B | | |
| 0 | 0 | 0 | 0 | 0 | 0 | NON-PURE COLOR | — |
| ⋮ | ⋮ | ⋮ | ⋮ | ⋮ | ⋮ | ⋮ | ⋮ |
| 170 | 17 | 0 | 180 | 10 | 5 | NON-PURE COLOR | — |
| 170 | 17 | 17 | 180 | 10 | 20 | NON-PURE COLOR | — |
| ⋮ | ⋮ | ⋮ | ⋮ | ⋮ | ⋮ | ⋮ | ⋮ |
| 255 | 255 | 102 | 245 | 245 | 90 | PURE COLOR Y | 7 |
| 255 | 255 | 119 | 245 | 245 | 110 | PURE COLOR Y | 5 |
| ⋮ | ⋮ | ⋮ | ⋮ | ⋮ | ⋮ | ⋮ | ⋮ |
| 255 | 255 | 255 | 255 | 255 | 255 | NON-PURE COLOR | — |

1702

| INPUT VALUES | | | OUTPUT VALUES | | | | PURE COLOR INFORMATION |
|---|---|---|---|---|---|---|---|
| R | G | B | C | M | Y | K | |
| 0 | 0 | 0 | 100 | 100 | 100 | 255 | NON-PURE COLOR |
| 0 | 0 | 17 | 120 | 100 | 100 | 220 | NON-PURE COLOR |
| 0 | 0 | 34 | 140 | 100 | 100 | 200 | NON-PURE COLOR |
| ⋮ | ⋮ | ⋮ | ⋮ | ⋮ | ⋮ | ⋮ | ⋮ |
| 170 | 0 | 0 | 100 | 200 | 200 | 0 | NON-PURE COLOR |
| 170 | 0 | 17 | 90 | 200 | 200 | 0 | NON-PURE COLOR |
| ⋮ | ⋮ | ⋮ | ⋮ | ⋮ | ⋮ | ⋮ | ⋮ |
| 221 | 170 | 34 | 60 | 120 | 240 | 0 | NON-PURE COLOR |
| 221 | 170 | 51 | 60 | 120 | 230 | 0 | NON-PURE COLOR |
| ⋮ | ⋮ | ⋮ | ⋮ | ⋮ | ⋮ | ⋮ | ⋮ |
| 255 | 255 | 238 | 0 | 0 | 30 | 0 | PURE COLOR |
| 255 | 255 | 255 | 0 | 0 | 0 | 0 | NON-PURE COLOR |

1703

INFORMATION PROCESSING APPARATUS THAT GENERATES COLOR CONVERSION TABLE TO BE SET IN IMAGE FORMING APPARATUS, INFORMATION PROCESSING METHOD, AND STORAGE MEDIUM

BACKGROUND OF THE INVENTION

Field of the Invention

The present invention relates to an information processing apparatus that generates a color conversion table to be set in an image forming apparatus, and to an information processing method, and a storage medium.

Description of the Related Art

An electrophotographic apparatus forms an image using toners of cyan, magenta, yellow, and black (hereinafter abbreviated to C, M, Y, and K). On the other hand, most of electronic data to be displayed on a display expresses an image in color space of red, green, and blue (hereinafter abbreviated to R, G, and B). Thus, in a case where the electronic data to be displayed on the display is output by the electrophotographic apparatus, data (hereinafter referred to as RGB data) expressed in RGB color space needs to be converted into data (hereinafter referred to as CMYK data) expressed in CMYK color space.

For the conversion of the RGB data to be input into the CMYK data, a three-dimensional look up table (3D-LUT) is used. The 3D-LUT serving as a color conversion parameter is data in which CMYK data of output signal values corresponding to RGB data that is thinned out at a certain interval is written.

Japanese Patent No. 5943666 discusses a system using a 3D-LUT that converts RGB data into RGB data that depends on the color gamut of a device, and a 3D-LUT that converts the RGB data which depends on the color gamut of the device into CMYK data in order to cause the color of an output material to become the target value.

However, in the 3D-LUT, output signal values corresponding to RGB data of input signal values are individually defined. Consequently, discontinuity can occur between output signal values corresponding to contiguous data (closest input signal values). In this case, a pseudo contour is generated on an image if data with a smooth tone change typified by gradation is output. The generation of pseudo contours can be reduced by performing smoothing processing on output signal values in the 3D-LUT. However, an increase in strength of the smoothing processing may significantly change color reproducibility. Moreover, even an output signal value that does not have a problem with a tone change (gradation) may be corrected.

SUMMARY OF THE INVENTION

According to an aspect of the present invention, an information processing apparatus that generates a color conversion table to be set in an image forming apparatus includes a memory device that stores a set of instructions, and at least one processor that executes the set of instructions to use a color conversion table to convert input signal values into output signal values, wherein the color conversion table is a conversion table for conversion of the input signal values into output signal values that depend on a color gamut of the image forming apparatus, extract a first signal value that highly correlates with a high-frequency component of an image, out of a plurality of elements of the output signal values, correct the extracted first signal value, and use the corrected first signal value and a second signal value extracted from the plurality of elements to correct the color conversion table.

Further features of the present invention will become apparent from the following description of exemplary embodiments with reference to the attached drawings.

BRIEF DESCRIPTION OF THE DRAWINGS

FIG. 11 is a diagram illustrating an example of a 3D-LUT for color conversion according to an exemplary embodiment.

FIG. 16 is a diagram illustrating an example of a signal value subsequent to color conversion/color separation according to the first exemplary embodiment.

FIG. 17 is a diagram illustrating pure color information according to fourth, fifth, and sixth exemplary embodiments.

DESCRIPTION OF THE EMBODIMENTS

Exemplary embodiments are hereinafter described with reference to the drawings.

In a first exemplary embodiment, information about lightness and chromaticity is extracted from output signal values to be output via a color conversion three-dimensional look up table (3D-LUT) that converts color of input signal values. Then, the extracted information is used to create a 3D-LUT that defines a relation between an input signal value and an output signal value (lightness), and a 3D-LUT that defines a relation between an input signal value and an output signal value (chromaticity). A description is given of a method for determining whether tone discontinuity has occurred with respect to the lightness in the 3D-LUT, and correcting the lightness in the 3D-LUT based on a determination result.

Figure 1:
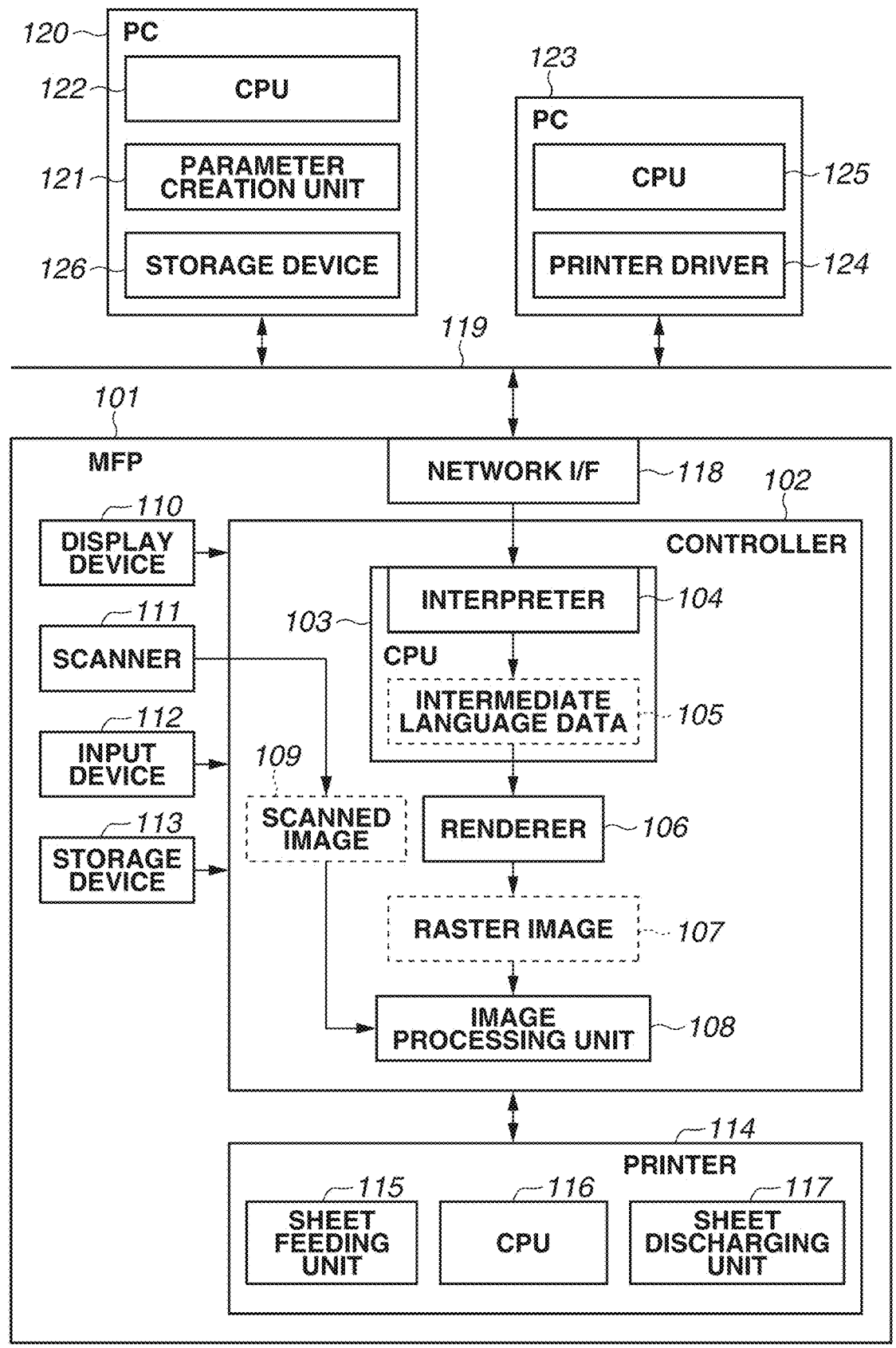
FIG. 1 is a configuration diagram illustrating a system.

FIG. 1 is a configuration diagram of a system according to the present exemplary embodiment. A multifunctional peripheral (MFP) 101 using toners of cyan (C), magenta (M), yellow (Y), and black (K) is connected to other network-enabled devices via a network 119. The MFP 101 is one example of an image forming apparatus. A single function printer can be used instead of the MFP. A personal computers (PCs) 120 and 123 serving as information processing apparatuses are connected to the MFP 101 serving as the image forming apparatus via the network 119. Print data is transmitted to the MFP 101 via a printer driver 124 according to an instruction from a central processing unit (CPU) 125 inside the PC 123.

The MFP 101 is described in detail. A network interface (I/F) 118 receives data such as print data. A controller 102 includes a CPU 103, a renderer 106, and an image processing unit 108. The CPU 103 includes an interpreter 104 that interprets a page description language (PDL) portion of the received print data to generate intermediate language data 105.

The renderer 106 generates a raster image 107 from the intermediate language data 105. The image processing unit 108 performs image processing on the raster image 107 and a scanned image 109 read by a scanner 111. The image processing unit 108 will be described in detail below.

A printer 114 connected to the controller 102 serves as an image forming unit that forms output data on a sheet with C, M, Y, and K toners. The printer 114 is controlled by a CPU 116, and includes a sheet feeding unit 115 that feeds a sheet and a sheet discharging unit 117 that discharges a sheet on which output data is formed.

A display device 110 is a user interface (UI) that displays an instruction to a user and a state of the MFP 101. The display device 110 is used in image diagnostic processing in addition to processing such as copy processing and transmission processing.

The scanner 111 includes an automatic document feeder (ADF). The scanner 111 irradiates a bundle of original images or a sheet of an original image with light from a light source (not illustrated) to form an original reflected image on a solid-state image sensor such as a charge-coupled device (CCD) sensor by using a lens. Then, the scanner 111 acquires a raster-like image reading signal as a scanned image 109 from the solid-state image sensor.

An input device 112 is an interface for receiving an input from a user. Since one portion of the input device 112 includes a touch panel, the input device 112 is integrated with the display device 110.

A storage device 113 stores, for example, data processed by the controller 102, and data received by the controller 102.

The PC 120 is connectable to the MFP 101 via the network 119. A parameter creation unit 121, according to an instruction from a CPU 122, uses data that is stored in a storage device 126 and is to be used by the image processing unit 108 of the MFP 101 to create a 3D-LUT for color conversion. The parameter creation unit 121, which creates a parameter of a value defined by such a color conversion table, will be described in detail below.

Figure 2:
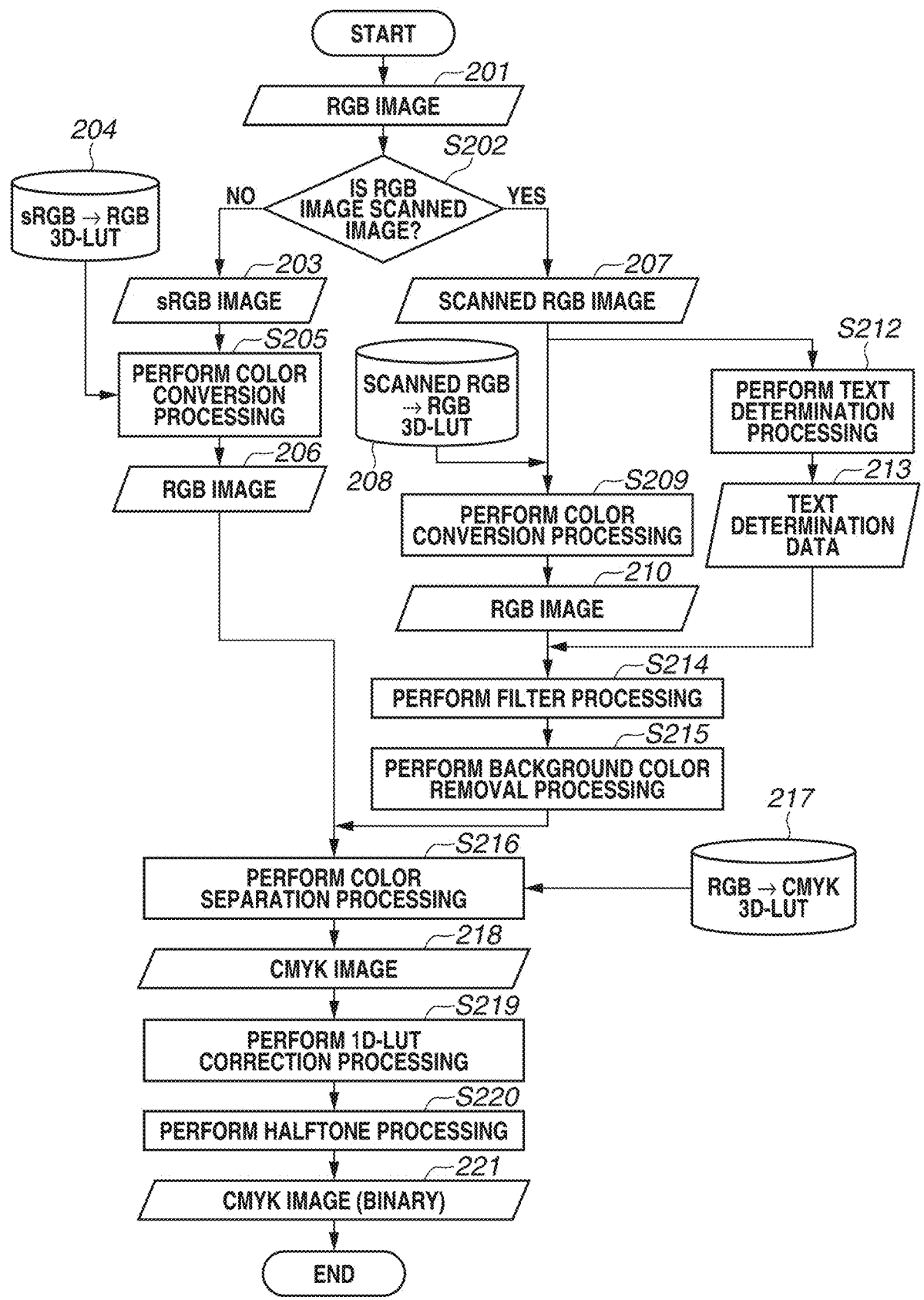
FIG. 2 is a flowchart of image processing.

Next, operations performed by the image processing unit 108 are described with reference to FIG. 2 that is a flowchart of image processing to be performed on the raster image 107 or an image read by the scanner 111. The processing illustrated in FIG. 2 is executed by an application specific integrated circuit (ASIC) (not illustrated) inside the image processing unit 108.

In step S202, the ASIC of the image processing unit 108 determines whether an RGB image 201 that has been received is the scanned image 109 read by the scanner 111 or the raster image 107 transmitted from the printer driver 124.

If it is determined that the RGB image 201 is the raster image 107 (NO in step S202), the RGB image 201 is treated as an sRGB image 203, and the subsequent operations are performed. In step S205, the ASIC uses a 3D-LUT 204 to convert the sRGB image 203 into an RGB image 206. The 3D-LUT 204 will be described in detail below. Here, the RGB image 206 is color space that depends on color reproducibility of the printer 114.

If it is determined that the RGB image 201 is the scanned image 109 (YES in step S202), the RGB image 201 is treated as a scanned RGB image 207, and the subsequent operations are performed. In step S209, the ASIC uses a 3D-LUT 208 to perform color conversion processing, and generates an RGB image 210. The 3D-LUT 208 will be described in detail below. Here, the scanned RGB image 207 is color space that depends on color reproducibility of the scanner 111. Moreover, the RGB image 210 is color space that depends on color reproducibility of the printer 114 as similar to the RGB image 206.

In step S212, the ASIC performs text determination processing on the scanned RGB image 207 to generate text determination data 213. Here, the ASIC detects, for example, an edge of the image to generate the text determination data 213.

Next, in step S214, the ASIC uses the text determination data 213 to perform filter processing on the RGB image 210. Here, the ASIC uses the text determination data 213 to perform respective kinds of different processing on a text portion and a portion other than the text portion. In step S215, the ASIC performs background color removal processing to remove a background color component.

Subsequently, in step S216, the ASIC uses a 3D-LUT 217 to perform color conversion processing (color separation processing) on the RGB image 206 or the RGB image 210, thereby generating a CMYK image 218. The 3D-LUT 217 will be described in detail below. In step S219, the ASIC uses a one-dimensional (1D) LUT to correct tone characteristics of single color of each of C, M, Y, and K. The 1D-LUT represents a one-dimensional LUT for correction of each of C, M, Y, and K colors.

Finally, in step S220, the ASIC performs image forming processing such as screen processing and error diffusion processing to generate a CMYK image (binary) 221.

Next, the 3D-LUTs 204, 208, and 217 will be described with reference to FIGS. 6A, 6B, 6C, and 11. An LUT 1101 in FIG. 11 is a parameter for converting input RGB signal values into RGB signal values that depend on a printer device. The LUT 1101 is an example of each of the 3D-LUTs 204 and 208. The LUT 1101 defines a combination of output signal values corresponding to a combination of R, G, and B signal values of input signals. Such an LUT in which output signal values are defined with respect to three dimensional (three types of) input signal values is hereinafter expressed as a "3D-LUT". In the 3D-LUT, not all of combinations of output signal values defined with respect to combinations of R, G, and B are written for the sake of reduction in the number of pieces of data. Only thinned out values are defined and written in the 3D-LUT. In the example of the LUT 1101, R, G, and B values (RGB data) are written on a 17-pitch basis.

In the 3D-LUT 217, output signal values with respect to input signals are pieces of CMYK data. Thus, the 3D-LUT 217 is written as a LUT 1102. A relation between the input signals and the output signals defined by each of these LUTs is stored beforehand in the storage device 113 of the MFP 101.

Figure 6A:
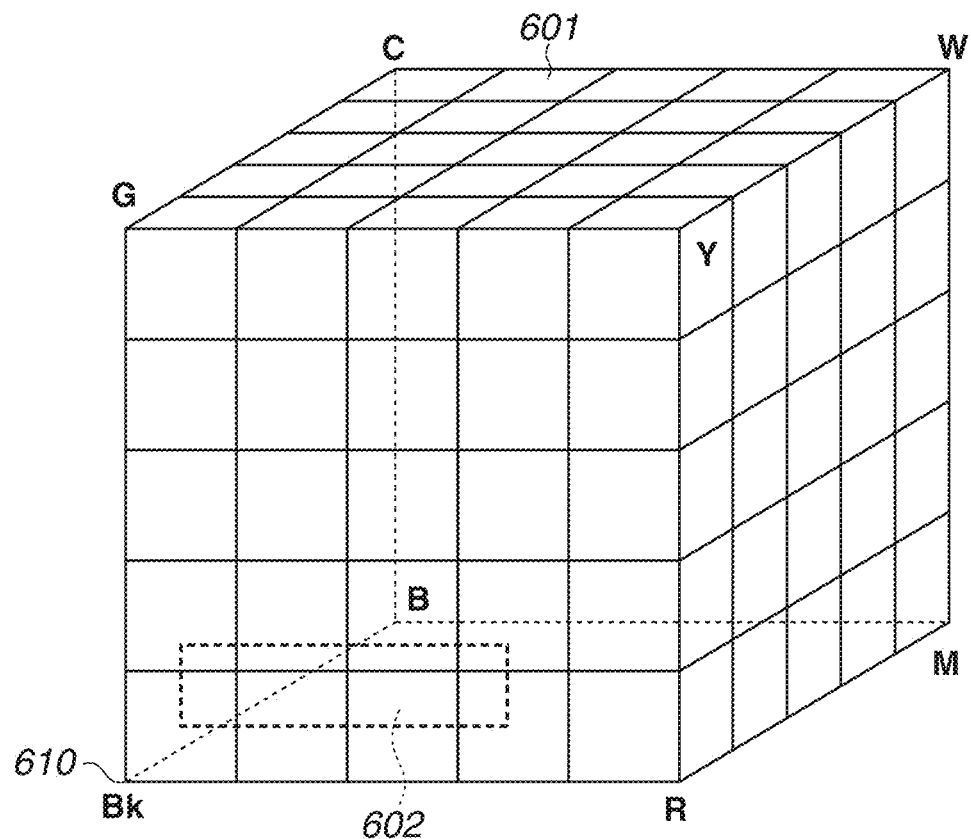
FIG. 6A is a diagram illustrating an example of a three-dimensional look up table (3D-LUT)

A cube 601 in FIG. 6A illustrates a relation between input signals and output signals given in the LUT 1101, and includes three-dimensional axes of R, G, and B. In the cube 601, lines are drawn such that input signal values that define output signal values are illustrated at a certain distance. A point in which the lines intersect is called a grid point, and values indicated by each grid point are input RGB data values in a 3D-LUT. In each grid point, output signal values corresponding to the input signal values represented by the grid point are defined. For example, a grid point 610 in FIG. 6A corresponds to a case where each of R, G, and B is zero in the LUT 1101.

In a 3D-LUT, output signal values are independently defined for each of grid points. Thus, balance of output signal values (C, M, Y, and K) defined for an adjacent grid point (which is arranged on the same axis as an attention grid point and includes input values that are nearest to input values corresponding to the attention grid point) can be disrupted. In a case where the LUT with the disrupted balance is used to convert data including a smooth tone change like gradation, and then the converted data is output, a pseudo contour can be generated in an image.

Figure 12:
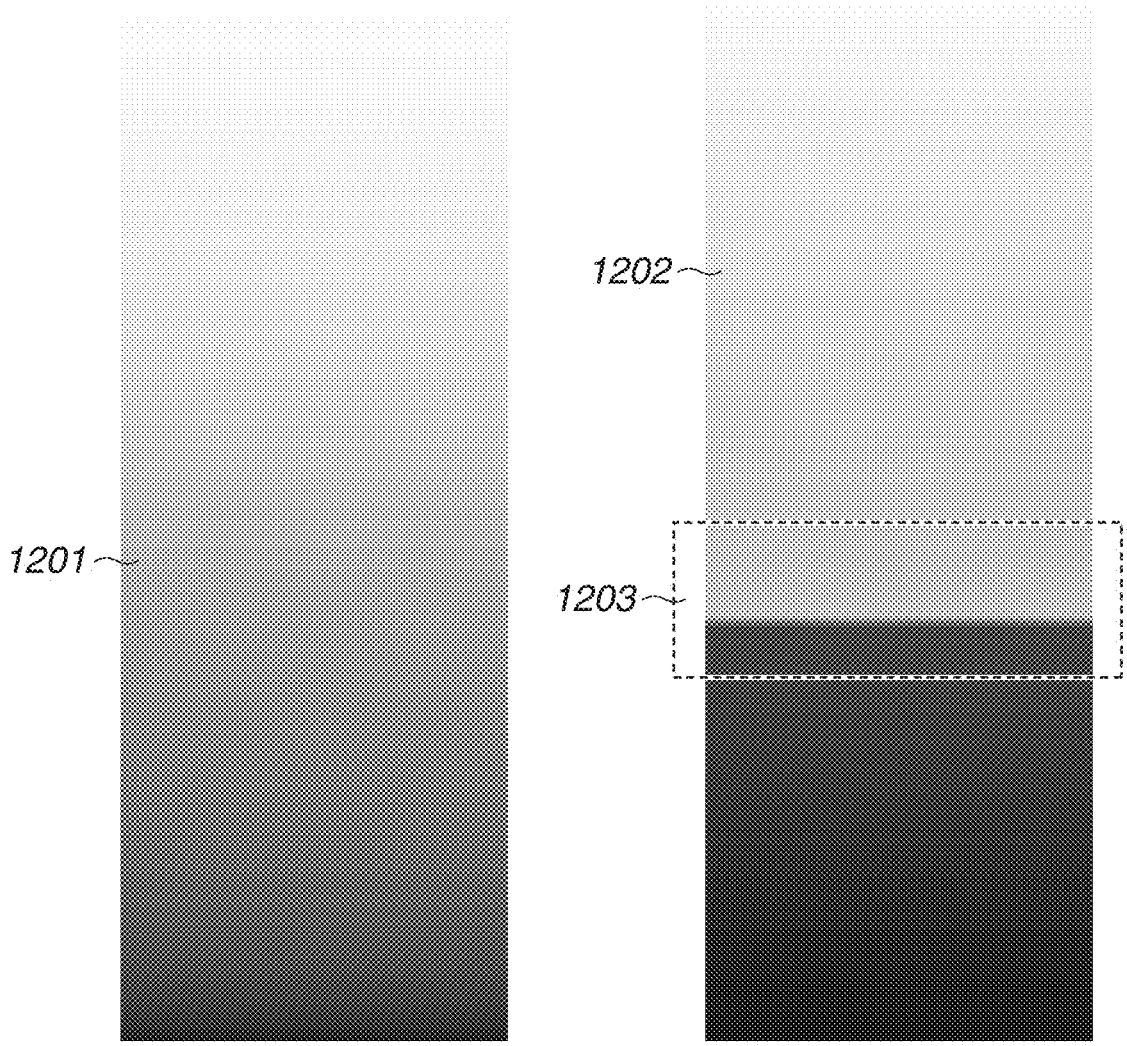
FIG. 12 is a diagram illustrating an example of a pseudo contour in a gradation image.

FIG. 12 illustrates an example of an image in which a pseudo contour is generated. In FIG. 12, an image 1201 is provided if input image data for gradation is appropriately output. On the other hand, an image 1202 is provided if input signal values of input image data for a gradation image are converted using a 3D-LUT with disrupted balance of output signal values, and then the resultant signal values are output. Such balance disruption of the output signals defined by the 3D-LUT causes generation of a pseudo contour 1203 as illustrated in an area indicated by a dotted line in FIG. 12. The pseudo contour is a phenomenon that occurs if there is an abrupt change in color/density in gradation, and provides a line like a contour in a location where a smooth change in color/density is normally made. In the present exemplary embodiment, the presence or absence of a pseudo contour caused by such a 3D-LUT is determined, and a 3D-LUT that can prevent generation of a pseudo contour is created.

Figure 3:
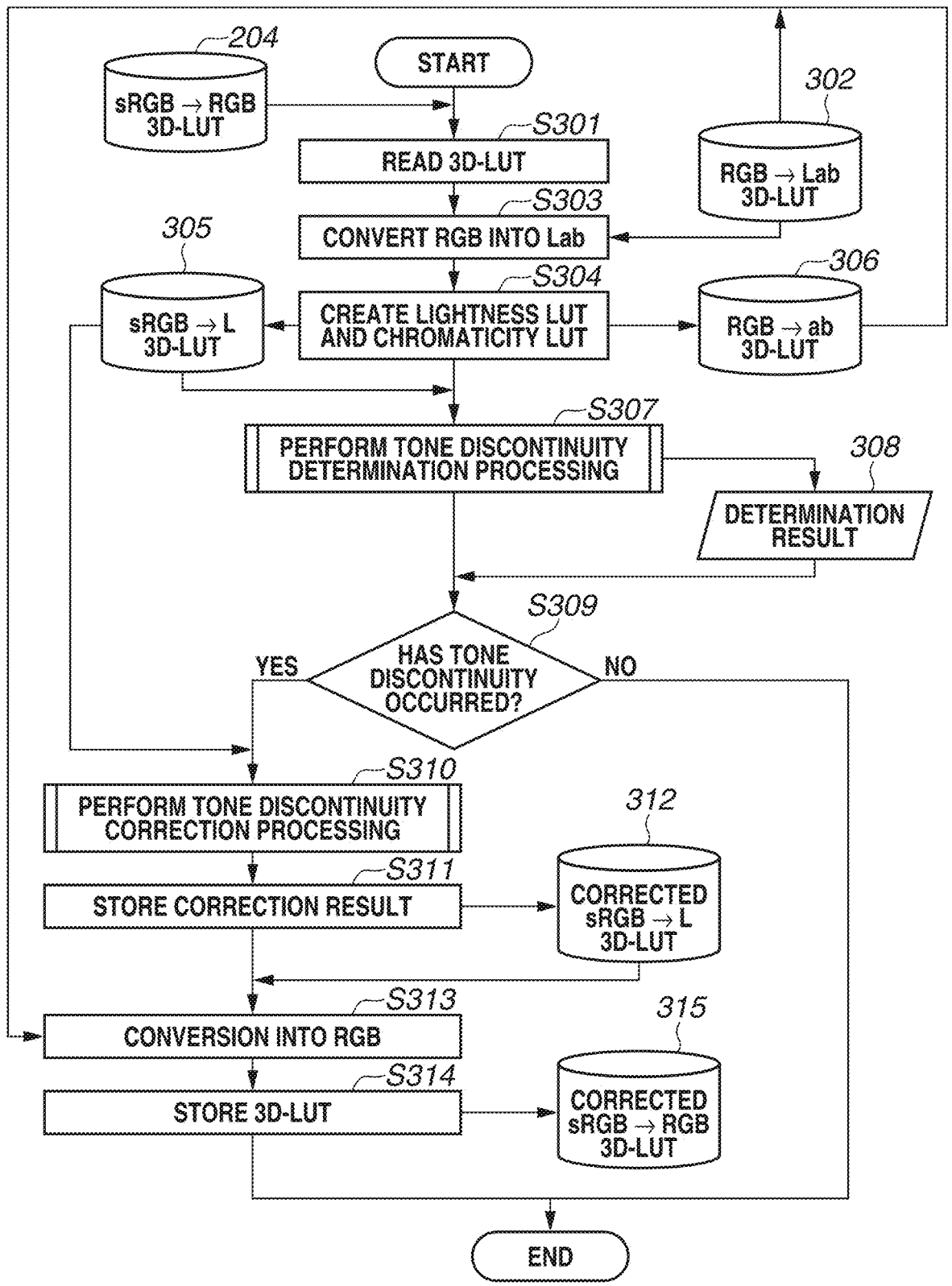
FIG. 3 is a flowchart of color conversion parameter correction processing according to a first exemplary embodiment.

Parameter creation processing according to the present exemplary embodiment is described with reference to FIG. 3. The parameter creation processing is controlled by the parameter creation unit 121 of the PC 120. A processing described below is executed by the CPU 122 inside the PC 120, and created data is stored in the storage device 126 of the PC 120 or the storage device 113 of the MFP 101. The processing in FIG. 3 is executed, for example, if an LUT stored beforehand in the storage device 113 of the MFP 101 is corrected in response to a pseudo contour found by a user.

In step S301, the CPU 122 reads the 3D-LUT 204, which converts sRGB into RGB. Here, the data stored beforehand in the storage device 113 of the MFP 101 is read via the network 119.

Subsequently, in step S303, the CPU 122 uses a 3D-LUT 302 that converts the RGB into Lab to convert output RGB signal values in the 3D-LUT 204 into Lab values. The term "Lab" used herein represents L*a*b* color space defined by International Commission on Illumination (CIE). The 3D-LUT 302 will be described below.

Subsequently, in step S304, the CPU 122 separates Lab values of output values in the 3D-LUT 302 into a signal value of lightness L (a first signal value) and signal values of chromaticity a and b (second signal values that are signal values other than the first signal value) out of a plurality of elements (L, a, b) of the Lab values. The CPU 122 creates a 3D-LUT 305 that converts sRGB into lightness L and a 3D-LUT 306 that converts sRGB into chromaticity a and b from the 3D-LUT 204 which converts sRGB into RGB and the 3D-LUT 302 which converts RGB into Lab, and stores the created 3D-LUTs 305 and 306 in the storage device 126. The 3D-LUTs 305 and 306 will be described below.

In step S307, the CPU 122 performs determination processing on the 3D-LUT 305 to determine whether tone discontinuity has occurred, and stores a determination result 308 in the storage device 126. If the CPU 122 determines that "tone discontinuity" has occurred in the 3D-LUT, the tone discontinuity causes "a pseudo contour" to appear on an image. The processing for determining whether tone discontinuity has occurred will be described in detail below.

In step S309, if the CPU 122 determines that the tone discontinuity has not occurred based on the determination result 308 read from the storage device 126 (NO in step S309), there is no problem in the 3D-LUT 204 and the operation ends.

On the other hand, if the CPU 122 determines that the tone discontinuity has occurred (YES in step S309), the operation proceeds to step S310. In step S310, the CPU 122 corrects the 3D-LUT 305 to suppress generation of the tone discontinuity. In step S311, the CPU 122 stores in the storage device 126 a 3D-LUT 312 that converts the corrected sRGB into lightness L. The correction processing for suppressing generation of tone discontinuity will be described in detail below.

Subsequently, in step S313, the CPU 122 uses the 3D-LUT 312 corrected in step S310 and the 3D-LUT 306 created in step S304 to calculate Lab values. Then, the CPU 122 uses the 3D-LUT 302 which converts RGB into Lab to convert the calculated Lab values into RGB values. Here, the CPU 122 compares the calculated Lab values with Lab values on an output side of the 3D-LUT 302, and outputs RGB values that provide the nearest Lab values, as converted RGBs.

Finally, in step S314, the CPU 122 stores a 3D-LUT 315 in the storage device 113 of the MFP 101. The 3D-LUT 315 converts sRGB into RGB by using the RGB values corrected in step S313.

Here, a description is given of a reason for correction of only the 3D-LUT 305, which converts sRGB into lightness L, in step S310 without correction of the 3D-LUT 306, which converts sRGB into chromaticity a and b. Generally, among components included in color, a brightness/lightness component has high contrast sensitivity in a high-frequency component, whereas a chromaticity component has high contrast sensitivity in a low-frequency component. If contrast sensitivity is high, a human being can visually determine a change in color/density. Accordingly, a high-frequency component of image data highly correlates with a brightness/lightness component out of color components of an image. If the brightness/lightness component changes, an amount of change in the high-frequency component of the image data is greater than an amount of change in the low-frequency component. Moreover, a low-frequency component of image data highly correlates with a chromaticity component out of color components of an image. If the chromaticity component changes, an amount of change in the low-frequency component of the image data is greater than an amount of change in a high-frequency component.

The pseudo contour 1203 is a phenomenon in which an inappropriate line is seen in an output image. Moreover, since a line is an edge component, the line is generally considered as a high-frequency component. Accordingly, correction of lightness L having high contrast sensitivity in a high-frequency component can prevent generation of a pseudo contour which appears as an inappropriate line, so that the pseudo contour cannot be seen in an image.

On the other hand, the chromaticity a and b is less affected by generation of a pseudo contour. However, correction of the chromaticity a and b may change reproducibility. That is, the correction of the chromaticity a and b does not contribute to prevention of a pseudo contour, and may inappropriately correct color reproducibility. In the present exemplary embodiment, therefore, chromaticity is not corrected.

According to the present exemplary embodiment, the processing for correcting only the 3D-LUT 305 which converts sRGB into lightness L is executed, so that generation of a pseudo contour in an output image can be prevented while color reproducibility of an output image is maintained.

Next, the 3D-LUTs 302, 305, and 306 are described with reference to FIG. 11. In FIG. 11, an LUT 1103 indicates the 3D-LUT 302, which converts sRGB into Lab. Moreover, an LUT 1104 in FIG. 11 indicates the 3D-LUT 305, which convers sRGB into lightness L. An LUT 1105 in FIG. 11 indicates the 3D-LUT 306, which converts sRGB into chromaticity a and b.

The processing for determining whether tone discontinuity has occurred in step S307 of the flowchart in FIG. 3 is described with reference to FIG. 4.

In step S401, the CPU 122 reads the 3D-LUT 305, which converts sRGB into lightness L.

Next, in step S402, the CPU 122 extracts data of lightness L of a grid point to which attention is to be paid as a processing target, and data of lightness L of a grid point peripheral to the attention grid point, from the 3D-LUT 305. Here, the peripheral grid point represents a grid point adjacent to the attention grid point (the peripheral grid point is arranged on the same axis as the attention grid point and has input values that are nearest to input values corresponding to the attention grid point).

Subsequently, in step S403, the CPU 122 uses the lightness (L) defined for values (R, G, B) of the attention grid point, and the lightness (L) defined for values (R, G, B) of the peripheral grid point to calculate a second-order difference value 404. The second-order difference value 404 will be described in detail below.

Subsequently, in step S405, the CPU 122 reads a threshold value 406 stored in the storage device 126 and the second-order difference value 404. In step S407, the CPU 122 compares the threshold value 406 with the second-order difference value 404. If the second-order difference value 404 is greater than the threshold value 406, the CPU 122 determines that tone discontinuity has occurred and stores a determination result 408 in the storage device 126.

Finally, in step S409, the CPU 122 determines whether values (L) defined in all of grid points in the 3D-LUT 305 have been processed. If values (L) defined in all of grid points in the 3D-LUT 305 have not been processed yet (NO in step S409), the operation from step S402 is repeated. In step S402, lightness (L) is extracted using, as an attention grid point, a grid point in which a second-order difference value with respect to a defined lightness (L) has not been calculated. If the CPU 122 determines that values (L) defined in all of grid points have been processed (YES in step S409), the operation in the flowchart in FIG. 4 ends.

Next, the second-order difference value 404 is described with reference to FIGS. 6A, 6B, and 6C.

Figure 6B:
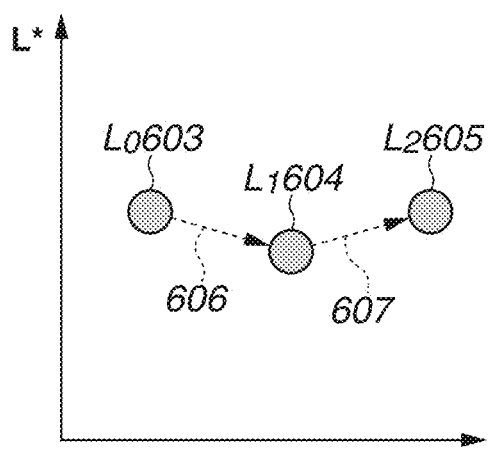
FIG. 6B is a diagram illustrating an example of tone discontinuity of a color conversion parameter according to the first exemplary embodiment.

FIG. 6B illustrates a state in which RGB values as values of three grid points in a range 602 in FIG. 6A are extracted, and the extracted RGB values are converted into lightness L. In FIG. 6B, a grid point 603 indicates the lightness of one of the three grid points, and a value thereof is defined as L0. Similarly, a value of a grid point 604 is defined as L1, and a value of a grid point 605 is defined as L2.

If an attention grid point is a grid point 604, and a value thereof is L1, a second-order difference is expressed as Expression 1.

$$\text{dif}=(L2-L1)-(L1-L0) \qquad \text{Expression 1:}$$

In FIG. 6B, "L1−L0" represents an inclination 606 between grid points. Similarly, "L2−L1" represents an inclination 607 between grid points. A difference between the inclinations 606 and 607, that is, a change in inclination, is a second-order difference value.

If there is a difference between the inclinations 606 and 607 as illustrated in FIG. 6B, there is an abrupt change in lightness defined in the corresponding grid points. Moreover, as mentioned above, lightness has high sensitivity in a high-frequency component. Hence, if there is such an inclination difference, a pseudo contour is more likely to be generated in an image to be output. Moreover, a second-order difference value is increased. A state in which there is an abrupt change in lightness defined in each of adjacent grid points in a 3D-LUT is defined as "tone discontinuity is to occur".

Figure 6C:
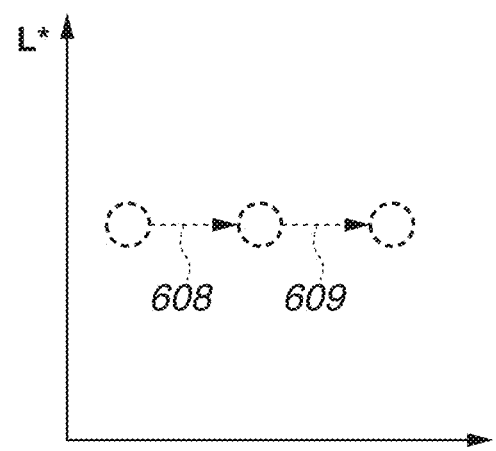
FIG. 6C is a diagram illustrating a state subsequent to correction of the tone discontinuity of the color conversion parameter according to the first exemplary embodiment.

On the other hand, if a there is no difference between inclinations 608 and 609 as illustrated in FIG. 6C, a second-order difference value is minimized. Moreover, since lightness with high sensitivity in a high-frequency component does not change abruptly, a pseudo contour is less likely to be generated.

Next, tone discontinuity correction processing to be executed in step S310 will be described with reference to FIG. 5.

In step S501, the CPU 122 reads the 3D-LUT 305, which converts sRGB into lightness L, from the storage device 126.

Subsequently, in step S502, the CPU 122 extracts a lightness L value defined in a grid point to which attention is to be paid as a processing target, and a lightness L value defined in a grid point peripheral to the attention grid point, from the 3D-LUT 305.

In step S503, the CPU 122 uses the lightness L value defined in the attention grid point and the lightness L value defined in the peripheral grid point to calculate a second-order difference value 504.

In step S505, the CPU 122 determines whether the second-order difference value 504 has been calculated for all of grid point data. If the second-order difference value 504 has not been calculated for all of grid point data yet (NO in step S505), the operations in step S502 and the subsequent steps are repeated. If the second-order difference values 504 have been calculated for all of grid points (YES in step S505), the operation proceeds to step S506. In step S506, the CPU 122 stores the second-order difference values of all the grid points in the storage device 126 as correction data 507. Here, as for the correction data 507, the second-order difference value calculated in step S503 may not necessarily be used. Alternatively, a coefficient for increasing or decreasing the calculated value can be multiplied.

Subsequently, in step S508, the CPU 122 performs 3D-LUT correction processing by using the correction data 507 and the pre-correction 3D-LUT 305, which converts sRGB into lightness L, and stores a post-correction 3D-LUT 509 in the storage device 126. Expression 2 is an example of the correction processing.

$$L'(R,G,B)=L(R,G,B)-\alpha*\text{grad}(R,G,B) \quad \text{Expression 2:}$$

In Expression 2, where L'(R, G, B) is lightness defined in a grid point in a post-correction 3D-LUT, L(R, G, B) is lightness defined in a grid point in a pre-correction 3D-LUT, grad (R, G, B) is a second-order difference of lightness defined in a grid point, and a is a coefficient for increasing and decreasing the second-order difference.

Expression 2 is one of optimization methods, and the processing is repeated, so that the grad (R, G, B) becomes smaller. That is, the second-order difference value becomes smaller, and a pseudo contour is prevented from being generated in an output image.

In the present exemplary embodiment, a second-order difference value is used in grad (R, G, B). However, for example, a second-order differential filter may be used as long as a method can detect a change in inclination of lightness.

Subsequently, in step S510, the CPU 122 determines whether the correction processing in the step S508 has been performed the designated number of times. If it is determined that the correction processing has not been performed the designated number of times yet (NO in step S510), the operation proceeds to step S511 in which the CPU 122 reads the post-correction 3D-LUT from the storage device 126. Then, the operations in step S502 and the subsequent steps are repeated.

On the other hand, if it is determined that the correction processing has been performed the designated number of times (YES in step S510), the operation ends. Herein, the correction processing is not necessarily performed the designated number of times. Alternatively, the CPU 122 may perform threshold value determination with respect to the second-order difference value 504. In such a case, if a determination result is a threshold value or less, the CPU 122 determines that the second-order difference value is small and the processing can end.

Moreover, in the present exemplary embodiment, the correction processing is performed on lightness L. However, the present exemplary embodiment can be executed using, for example, brightness, as long as a signal value has high contrast sensitivity in a high-frequency component.

In the present exemplary embodiment, processing for determining whether tone discontinuity has occurred is performed, and then correction processing is performed on a 3D-LUT. However, such determination processing can be omitted, and the correction processing can be executed. If there is no tone discontinuity, a pre-correction 3D-LUT and a post-correction 3D-LUT are the same or nearly the same.

In the present exemplary embodiment, a 3D-LUT that converts sRGB into RGB is processed. However, such correction processing can be performed on a 3D-LUT that converts scanned RGB into RGB.

In the present exemplary embodiment, a 3D-LUT, which converts sRGB into RGB is processed. However, such correction processing can be performed on a 3D-LUT that converts RGB into CMYK by using a 3D-LUT that converts CMYK into Lab.

According to the present exemplary embodiment, tone discontinuity can be prevented from occurring in an output value defined by a 3D-LUT for color conversion while color reproducibility of an image to be output is being maintained.

The first exemplary embodiment has been described using an example method by which determination of whether tone discontinuity has occurred is made with respect to lightness information out of output signal values defined by a 3D-LUT for color conversion, and the 3D-LUT is corrected based on a result of the determination.

However, visibility of a pseudo contour generated in a gradation image changes according to image lightness. For example, sensitivity of eyes to a dark portion of an image is lower than that to a halftone portion of the image. Hence, even if a second-order difference value is large, a pseudo contour generated in an image may not be visually ascertained.

A second exemplary embodiment is made in view of such a circumstance and described using an example case where processing for determining whether tone discontinuity has occurred and processing for correcting a 3D-LUT based on a result of the determination are changed, according to a lightness value.

Since parameter creation processing according to the present exemplary embodiment is similar to that described above with reference to FIG. 3 according to the first exemplary embodiment, a description thereof is omitted. The parameter creation processing is controlled by a parameter creation unit 121 of a PC 120. A processing described below is executed by a CPU 122 inside the PC 120, and created data is stored in a storage device 113 of an MFP 101.

Figure 7:
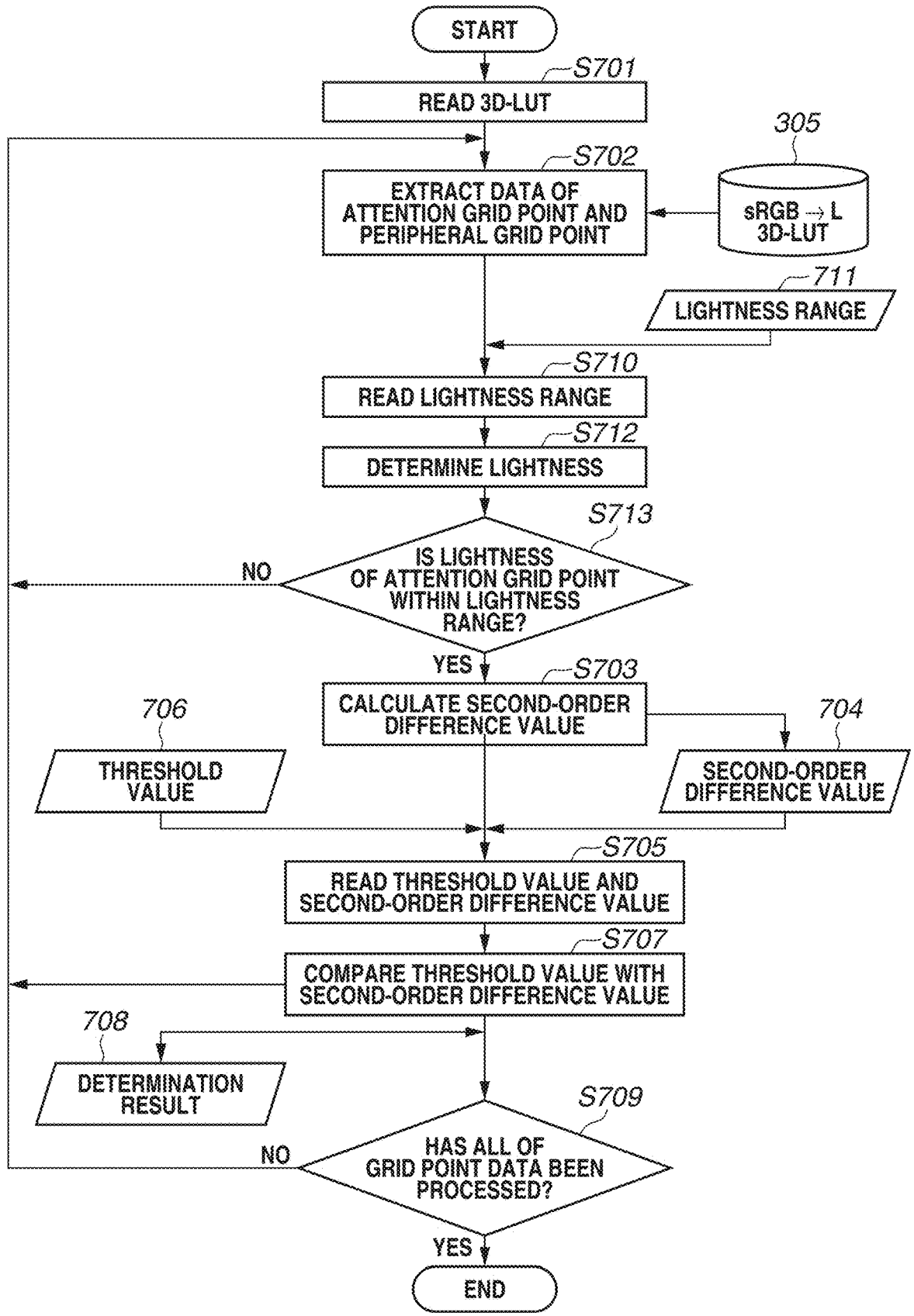
FIG. 7 is a flowchart of processing for determining whether tone discontinuity has occurred according to a second exemplary embodiment.

Next, tone discontinuity determination processing to be executed in step S307 of the flowchart in FIG. 3 is described with reference to FIG. 7.

Figure 4:
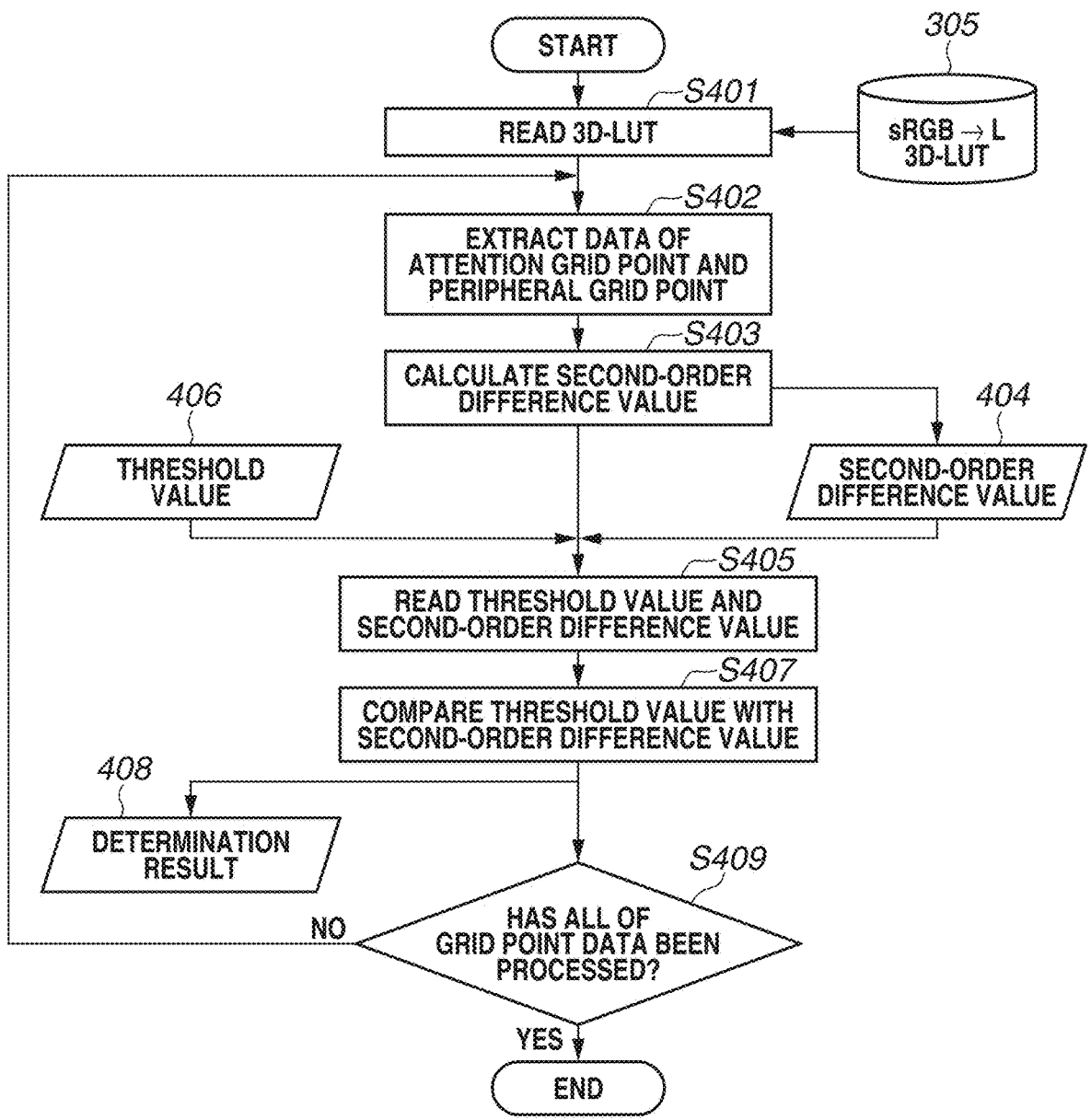
FIG. 4 is a flowchart of processing for determining whether tone discontinuity has occurred according to the first exemplary embodiment.

Since operations in steps S701 and S702 are similar to those in respective steps S401 and 402 of the flowchart in FIG. 4, descriptions thereof are omitted.

In step S710, the CPU 122 reads a processing target lightness range 711 from a storage device 126. Here, the processing target lightness range 711 indicates a lightness range as a target to undergo processing for determining whether tone discontinuity has occurred. For example, a range of lightness L=30 to 100 excluding lightness corresponding to a dark portion out of lightness L defined in grid points is set as a processing target lightness range.

Subsequently, in step S712, the CPU 122 performs lightness determination by using the processing target lightness range 711 and the lightness L of the attention grid point extracted in step S702.

In step S713, if the lightness of the attention grid point is not within the processing target lightness range 711 (NO in step S713), the CPU 122 determines that calculation of a second-order difference value is not necessary. Then, the operations in step S702 and the subsequent steps are repeated. If the lightness of the attention grid point is within the processing target lightness range 711 (YES in step S713), the CPU 122 determines that calculation of a second-order difference value is necessary to determine whether tone discontinuity has occurred, and the operation proceeds to step S703.

Since the operations in steps S703 through S709 are similar to those in respective steps S403 through S409, descriptions thereof are omitted.

Figure 8:
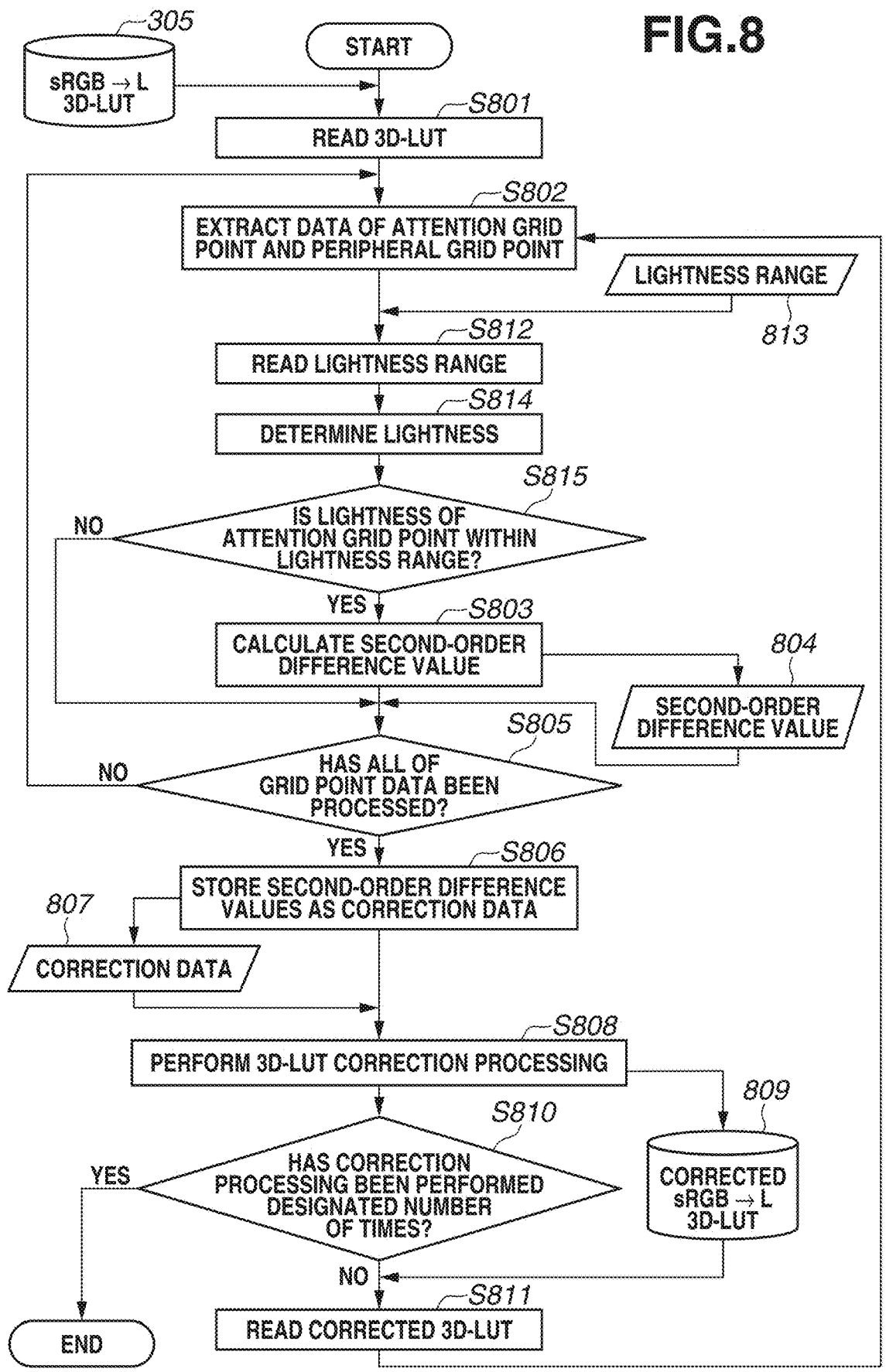
FIG. 8 is a flowchart of correction processing for preventing tone discontinuity according to the second exemplary embodiment.

Next, 3D-LUT correction processing to be executed in step S310 is described with reference to FIG. 8. The 3D-LUT correction processing prevents generation of tone discontinuity.

Figure 5:
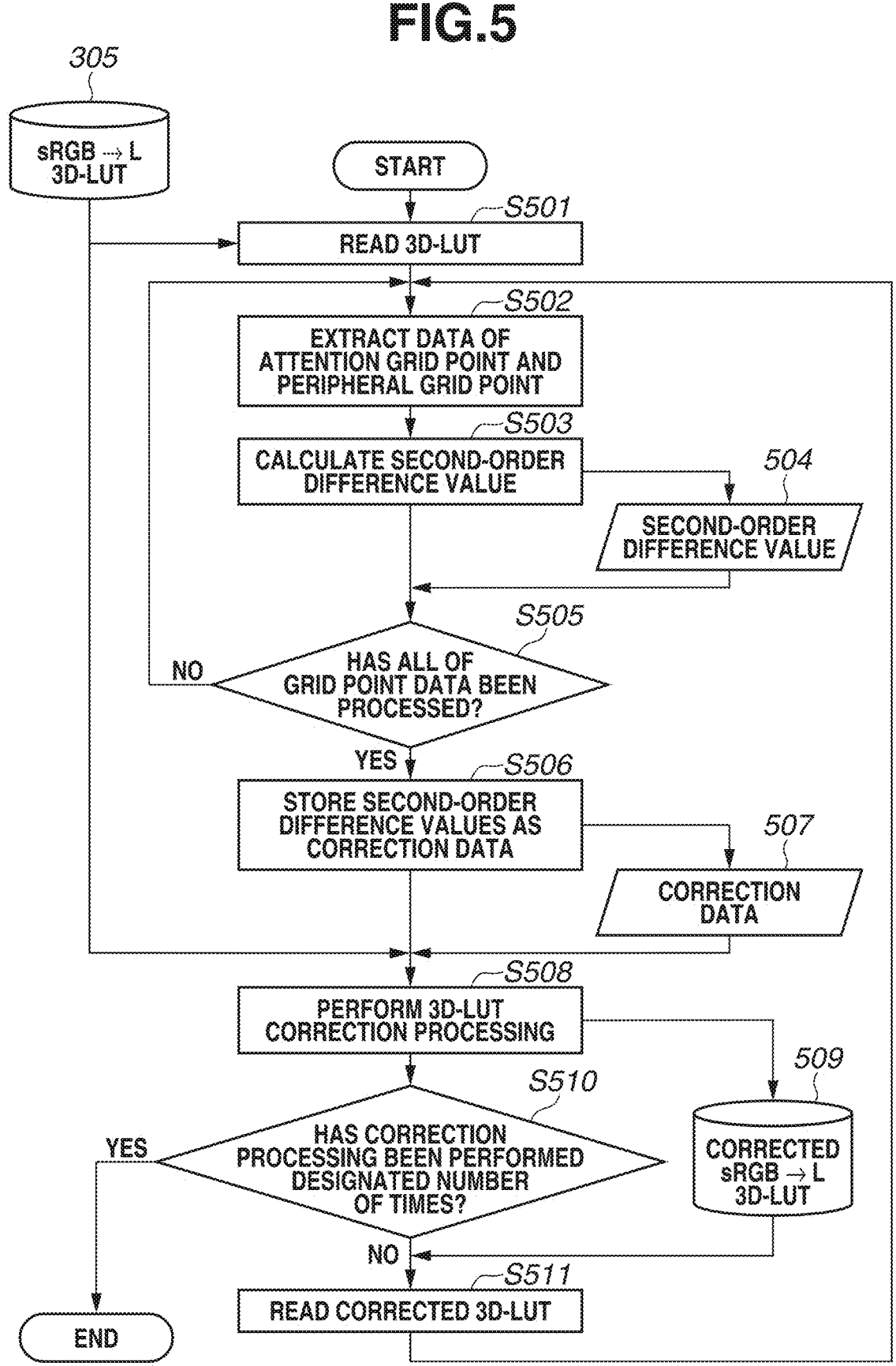
FIG. 5 is a flowchart of tone discontinuity correction processing according to the first exemplary embodiment.

Since operations in steps S801 and S802 are similar to those in respective steps S501 and S502 of the flowchart in FIG. 5, descriptions thereof are omitted.

In step S812, the CPU 122 reads a processing target lightness range 813 from the storage device 126. Here, the processing target lightness range 813 indicates a lightness range as a target to undergo processing for determining whether tone discontinuity has occurred.

Subsequently, in step S814, the CPU 122 performs lightness determination by using the processing target lightness range 813 and the lightness L of the attention grid point extracted in step S802.

In step S815, if the lightness of the attention grid point is not within the processing target lightness range 813 (NO in step S815), the CPU 122 determines that calculation of a second-order difference value is not necessary, and the operation proceeds to step S805. If the lightness of the attention grid point is within the processing target lightness range 815 (YES in step S815), the CPU 122 determines that calculation of a second-order difference value is necessary. Thus, in step S803, the CPU 122 calculates a second-order difference value 804.

Since operations in steps S803 through S811 are similar to those in respective steps S503 through S511 of the flowchart in FIG. 5, descriptions thereof are omitted.

The present exemplary embodiment has been described using an example case where the determination of whether tone discontinuity has occurred is made with respect to only data within a lightness range of a processing target, and the 3D-LUT correction processing is executed. However, processing for changing a second-order difference value according to a priority level may be executed.

In particular, processing for multiplying a coefficient for causing a second-order difference value to be smaller can be executed with respect to data out of the lightness range of the processing target.

According to the present exemplary embodiment, a range excluding a dark portion is set as a processing target lightness range. However, a lightness range excluding a highlight portion having a lightness L of approximately 100, for example, can be set as a processing target for other lightness. Similar to the dark portion, even if a pseudo contour is generated in a highlight portion of an image, a user often has a difficulty in visually observing the pseudo contour.

According to the present exemplary embodiment, tone discontinuity can be prevented from occurring in an output value to be defined by a 3D-LUT for color conversion while color reproducibility of an image to be output is being maintained.

According to the present exemplary embodiment, moreover, determination of whether tone discontinuity has occurred is made with respect to only data within a lightness range of a processing target, and correction is made with respect to a 3D-LUT. Accordingly, the correction processing can be exclusively performed on data portion in which a pseudo contour is more likely to be notable if an image is output.

The above exemplary embodiment has been described using an example method by which output signal values defined by a 3D-LUT for color conversion are converted into lightness/chromaticity information, determination of whether tone discontinuity has occurred is made with respect to the lightness information, and the 3D-LUT is corrected based on a result of the determination.

However, in the above-described exemplary embodiment, a lightness value is independently corrected. Consequently, if a corrected lightness value and a chromaticity value are combined, color data expressed by such combined values may be data indicating color out of a range of a color gamut reproducible by a printer 114. This may degrade correction accuracy.

A third exemplary embodiment is made in view of such a circumstance and described using an example case where correction processing is performed with specific lightness fixed.

Since parameter creation processing according to the present exemplary embodiment is similar to that described above with reference to FIG. 3 according to the first exemplary embodiment, a description thereof is omitted. The parameter creation processing is controlled by a parameter creation unit 121 of a PC 120. A processing described below is executed by a CPU 122 inside the PC 120, and created data is stored in a storage device 113 of an MFP 101. Since tone discontinuity determination processing is similar to that described above with reference to FIG. 4 according to the first exemplary embodiment, a description thereof is omitted.

Figure 9:
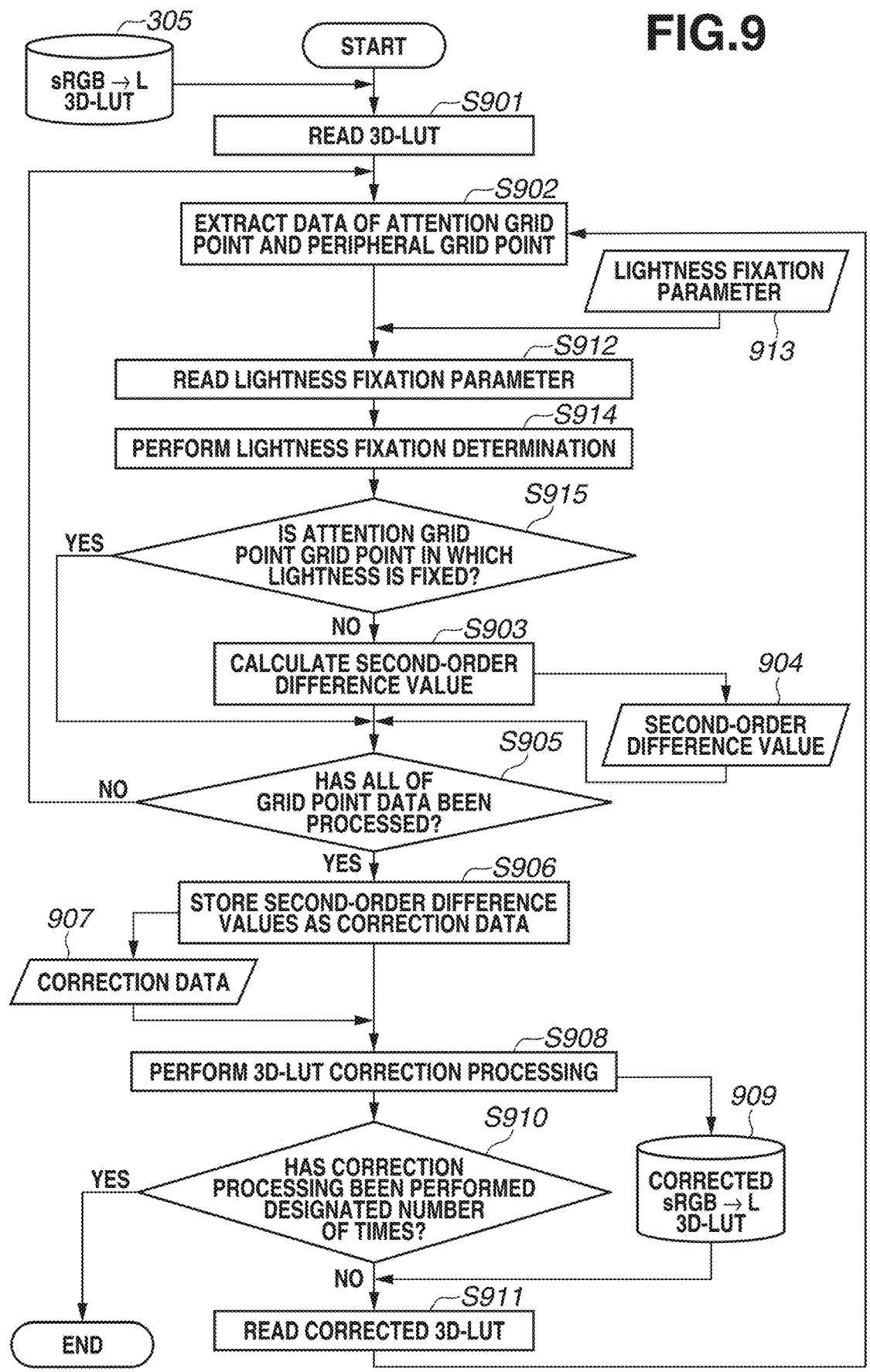
FIG. 9 is a flowchart of tone discontinuity correction processing according to a third exemplary embodiment.

Next, tone discontinuity correction processing to be executed in step S310 is described in detail with reference to FIG. 9.

Since operations in steps S901 and S902 are similar to those in respective steps S501 and S502, descriptions thereof are omitted.

In step S912, the CPU 122 reads a lightness fixation parameter 913 from a storage device 126. Here, the lightness fixation parameter 913 is a parameter in which determination of whether a second-order difference value is to be calculated with respect to each grid point corresponding to input signal values is defined. As for a grid point for which a second-order difference value is not calculated, lightness is not corrected and thus a lightness value is fixed. Processing for creating the lightness fixation parameter 913 will be described in detail with reference to FIG. 10.

In step S914, the CPU 122 performs lightness fixation determination by using the lightness fixation parameter 913 and the lightness L of the attention grid point extracted in step S902.

In step S915, if the attention grid point is a grid point in which lightness is fixed (YES in step S915), the CPU 122 determines that calculation of a second-order difference value is not necessary, and the operation proceeds to step S905. If the attention grid point is not a grid point in which lightness is fixed (NO in step S915), the CPU 122 determines that calculation of a second-order difference value is necessary, and the operation proceeds to step S903. In step S903, the CPU 122 calculates a second-order difference value 904.

Since operations in steps S903 through S911 are similar to those in respective steps S503 through S511 of the flowchart in FIG. 5, descriptions thereof are omitted.

Figure 10:
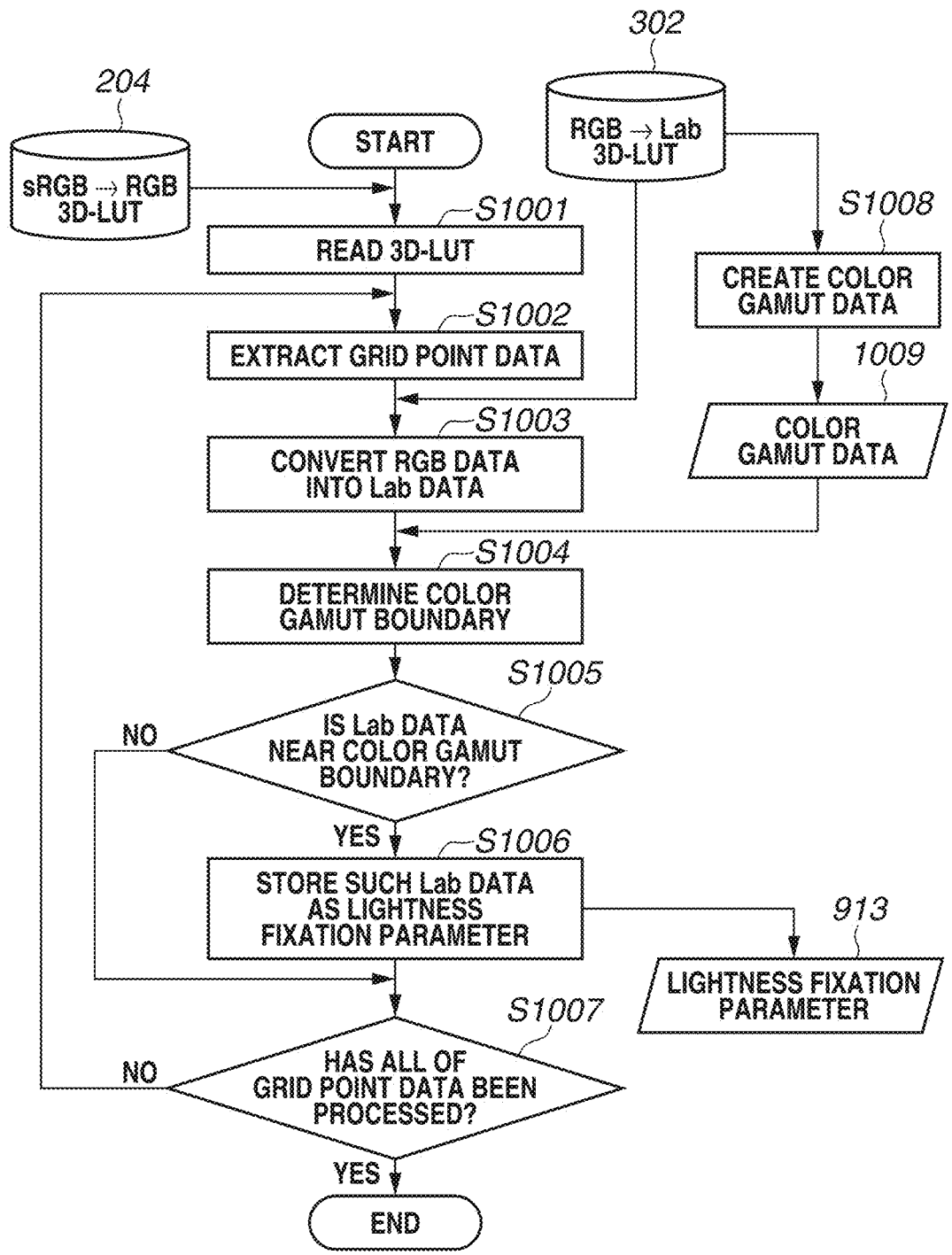
FIG. 10 is a flowchart of processing for creating a lightness fixation parameter according to the third exemplary embodiment.

Next, processing for creating the lightness fixation parameter 913 will be described with reference to FIG. 10. The lightness fixation parameter creation processing is controlled by the parameter creation unit 121 of the PC 120. A processing described below is realized by being executed by the CPU 122 inside the PC 120, and created data is stored in the storage device 113 of the MFP 101.

In step S1001, the CPU 122 reads a 3D-LUT 204 that converts sRGB into RGB from the storage device 126.

In step S1002, the CPU 122 extracts RGB data of a grid point to which attention is to be paid as a processing target, from the 3D-LUT 204.

In step S1003, the CPU 122 uses a 3D-LUT 302 that converts RGB into Lab to convert RGB data into Lab data.

Meanwhile, in step S1008, the CPU 122 uses the 3D-LUT 302 to create color gamut data 1009, and stores color gamut data 1009 in the storage device 126. Here, the color gamut data 1009 includes a plane formula with respect to three-dimensional space defined by Lab. The color gamut data 1009 includes values (Lab) of a color gamut reproducible by a printer 114.

Subsequently, in step S1004, the CPU 122 uses the color gamut data 1009 to determine whether the Lab data converted in step S1003 is near a color gamut boundary. The CPU 122 calculates a distance between a plane calculated from the plane formula of the color gamut data 1009 and the Lab data converted in step S1003 to determine whether the Lab data is in the color gamut boundary based on whether the distance is short.

In step S1005, if the CPU 122 determines that the Lab data converted in step S1003 is near the color gamut boundary (YES in step S1005), the Lab data is more likely to be out of the color gamut at execution of tone discontinuity correction processing. Thus, in step S1006, the CPU 122 stores such Lab data as the lightness fixation parameter 913.

If the CPU 122 determines that the Lab data is not near the color gamut boundary (NO in step S1005), the Lab data is not stored as a lightness fixation parameter.

Finally, in step S1007, the CPU 122 determines whether all of grid point data has been processed. If the CPU 122 determines that all the grid point data has not been processed yet (NO in step S1007), the operation returns to step S1002. If all the grid point data has been processed yet (YES step S1007), the operation ends.

In the present exemplary embodiment, determination of whether Lab data is in a boundary of a color gamut reproducible by the printer 114 is made, and a lightness fixation parameter is created. However, any condition under which lightness is fixed can be used. For example, processing by which lightness is fixed with respect to only specific hue can be performed.

According to the present exemplary embodiment, tone discontinuity can be prevented from occurring in an output value to be defined by a 3D-LUT for color conversion while color reproducibility of an image to be output is being maintained.

According to the present exemplary embodiment, moreover, lightness is not corrected under a specific condition, so that degradation in correction accuracy can be prevented.

A fourth exemplary embodiment is described. Each of the first through third exemplary embodiments has been described using an example method by which output signal values defined by a 3D-LUT for color conversion are converted into lightness/chromaticity information, determination of whether tone discontinuity has occurred is made with respect to the lightness information, and the 3D-LUT is corrected based on a result of the determination.

However, in each of the first through third exemplary embodiments, since RGB values are corrected without consideration of color separation processing, color material that is not used in the first place may be used after color separation.

In an example illustrated in FIG. 16, data 1601 represents signal values of an sRGB image 203. Data 1602 represents a result acquired by performing the color conversion processing in step S205 and the color separation processing in step S216 with respect to the signal values in the data 1601. Here, as for data in an area 1603, only a color material Y is used, and color materials C, M, and K each having a value of zero are not used. Color in which only a specific color material is used is defined as "pure color". The example in FIG. 16 includes a "pure color" example in which only a color material Y is used. However, there is a "pure color" in which a plurality of color materials is used. For example, color materials M and Y may be used, and color materials C and K may be zero. Even in such a case, a "pure color" can be provided.

Data 1604 is provided in a case where the 3D-LUT corrected in the first exemplary embodiment is used for the color conversion in step S205. Since the use of the corrected 3D-LUT changes a result of the RGB image 206 with color that is converted in step S205. The change in the RGB image 206 changes CMYK subsequent to color separation.

Particularly, as for former "pure color" data in an area 1605, cyan that is not used in the first place is generated, and thus "pure color" is no longer maintained. Although the "pure color" is not maintained, a pseudo contour is not generated since change in lightness is corrected. However, in a case where a "pure color" is not maintained, graininess may be degraded by influence of other color materials. In the area 1605, for example, a mixture of C and Y can form C fine dots subsequent to the halftone processing in step S220. This may degrade graininess.

The present exemplary embodiment is made in view of such a circumstance and described using an example case where correction processing is performed using pure color information. The pure color information represents information that defines, as a pure color, a color indicating whether only a specific color material is used if conversion is made to color material information to be used by an image forming apparatus, and indicating whether a state in which only the specific color material is used needs to be maintained.

Figure 13:
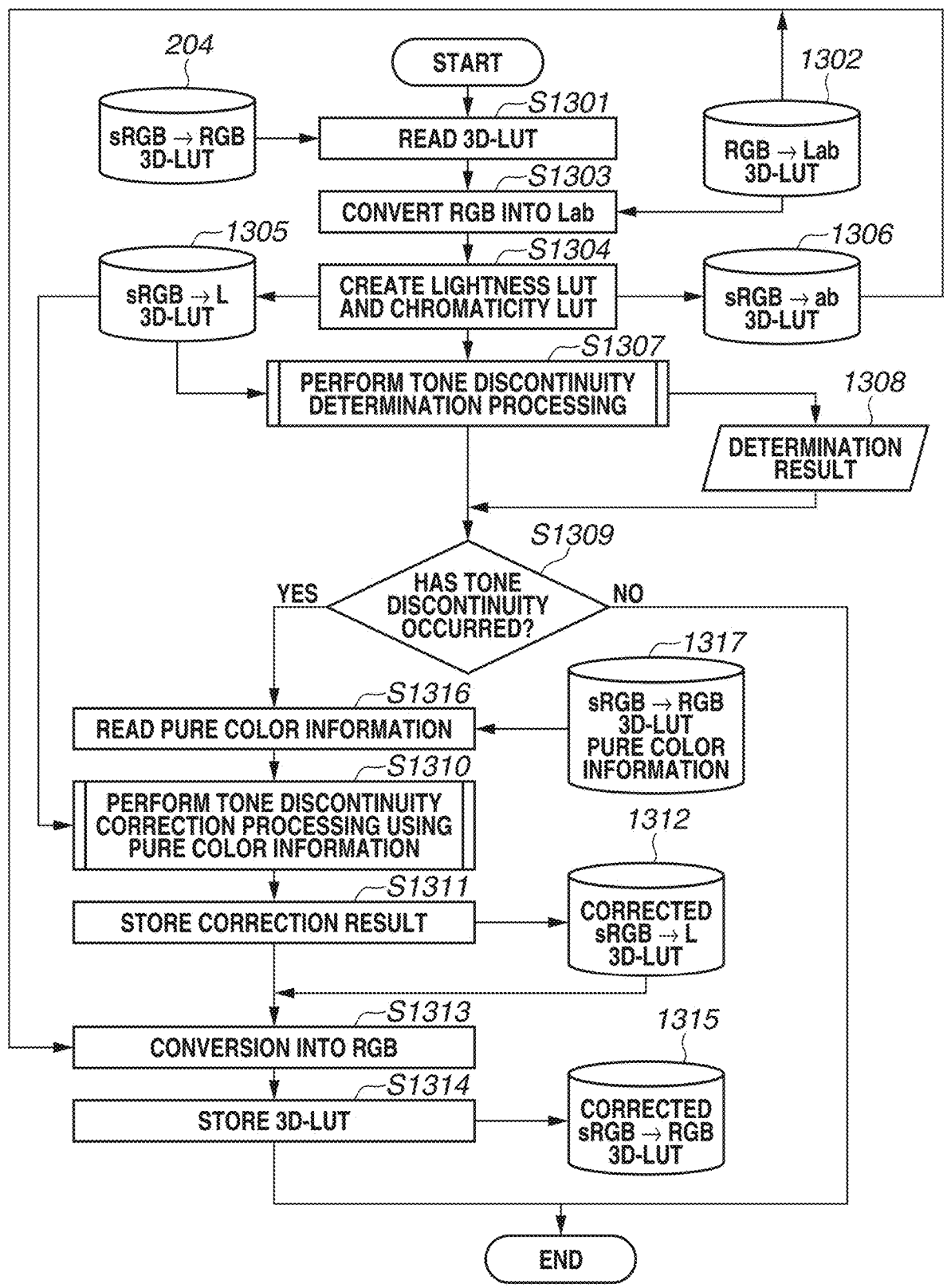
FIG. 13 is a flowchart of color conversion parameter correction processing according to a fourth exemplary embodiment.

Parameter creation processing according to the present exemplary embodiment is described with reference to FIG. 13.

The parameter creation processing is controlled by a parameter creation unit 121 of a PC 120. A processing described below is executed by a CPU 122 inside the PC 120, and created data is stored in a storage device 113 of an MFP 101. Since tone discontinuity determination processing is similar to that described above with reference to FIG. 4 according to the first exemplary embodiment, a description thereof is omitted.

Since operations in steps S1301 through S1309 are similar to those in respective steps S301 through S309 in FIG. 3, descriptions thereof are omitted.

Moreover, since operations in steps S1311 through S1314 are similar to those in respective steps S311 through S314 in FIG. 3, descriptions thereof are omitted.

In step S1309, if the CPU 122 determines that tone discontinuity has occurred (YES in step S1309), the operation proceeds to step S1316. In step S1316, the CPU 122 reads pure color information 1317.

In step S1310, the CPU 122 performs tone discontinuity correction processing by using the pure color information 1317.

The pure color information 1317 is described with reference to FIG. 17. In FIG. 17, data 1701 is an example of the pure color information 1317 corresponding to a 3D-LUT 204 that converts sRGB into RGB. The data 1701 defines whether a combination of RGB signals of input signals provides a pure color. The example in FIG. 17 includes RGB values to serve as output values. However, the RGB values may not necessarily be included.

The tone discontinuity correction processing is described with reference to FIG. 14.

Figure 14:
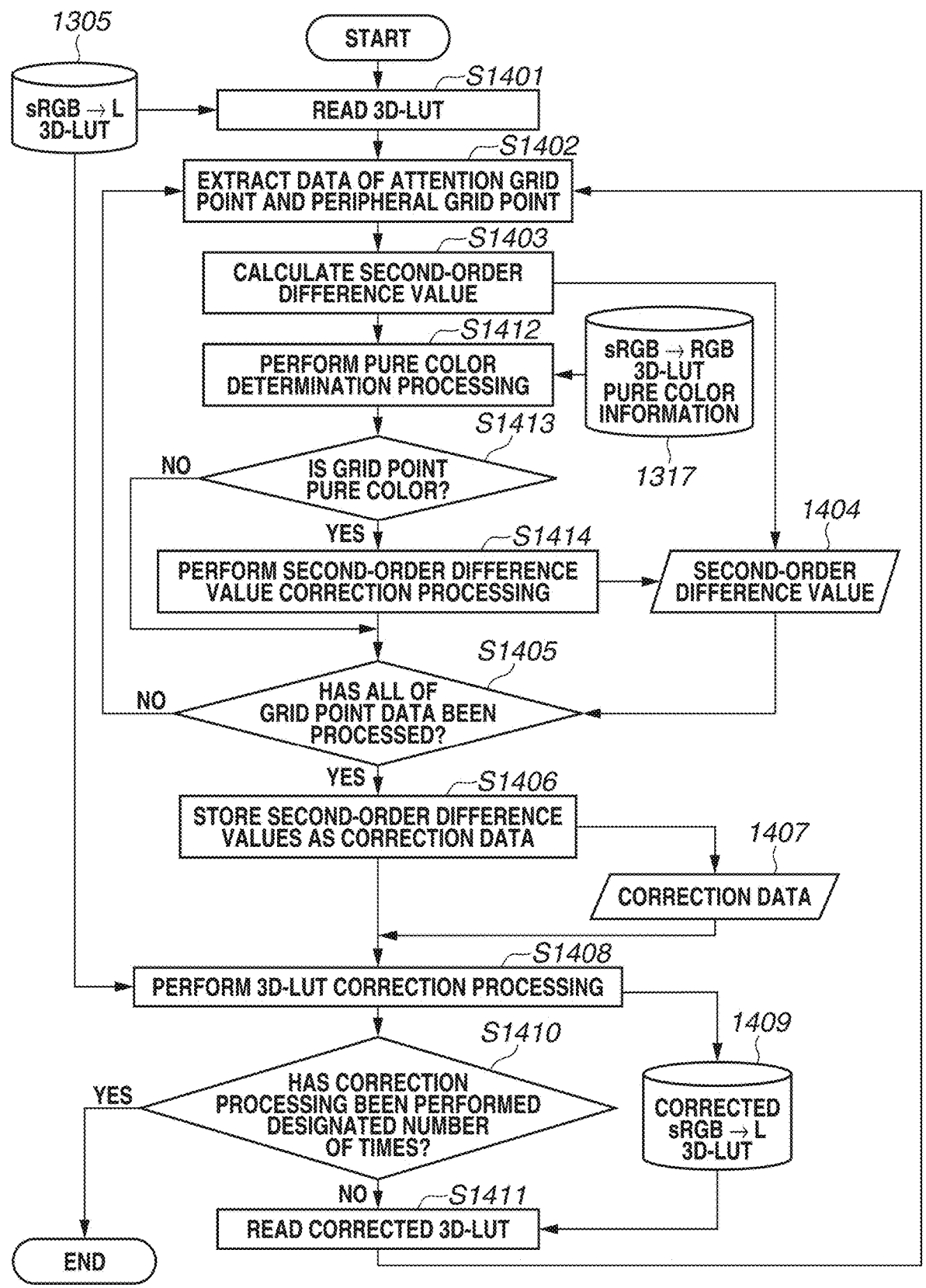
FIG. 14 is a flowchart of tone discontinuity correction processing according to the fourth exemplary embodiment.

Since operations in steps S1401 through S1411 of the flowchart in FIG. 14 are similar to those in respective steps S501 through S511 of the flowchart in FIG. 5, descriptions thereof are omitted.

In step S1412, the CPU 122 uses the pure color information 1317 to perform pure color determination processing. Herein, RGB values of input values of the grid point extracted in step S1402 are used to make a comparison with the pure color information 1317. Then, in step S1413, the CPU 122 determines whether the grid point is a pure color. For example, in the example data 1701 in FIG. 17, if RGB values are 170, 17, and 0, the CPU 122 determines that a grid point with such RGB values is not a pure color. If RGB values are 255, 255, and 102, the CPU 122 determines that a grid point with such RGB values is a pure color.

In step S1413, if the CPU 122 determines that the grid point is not a pure color (NO in step S1413), the operation proceeds to step S1405.

If the CPU 122 determines that the grid point is a pure color (YES in step S1413), the operation proceeds to step S1414. In step S1414, the CPU 122 performs second-order difference correction processing, and replaces a result of a second-order difference 1404. Then, the operations in step S1402 and the subsequent steps are repeated.

Here, the second-order difference correction processing is processing by which a second-order difference is reduced. Reduction in a second-order difference reduces a correction amount of a pure-color grid point, so that changes in RGB values subsequent to pure color correction can be prevented. Here, a difference at the time of reduction in the second-order difference may be zero.

A result of the correction processing described in FIG. 14 is described with reference to FIGS. 15A through 15C.

Figure 15A:
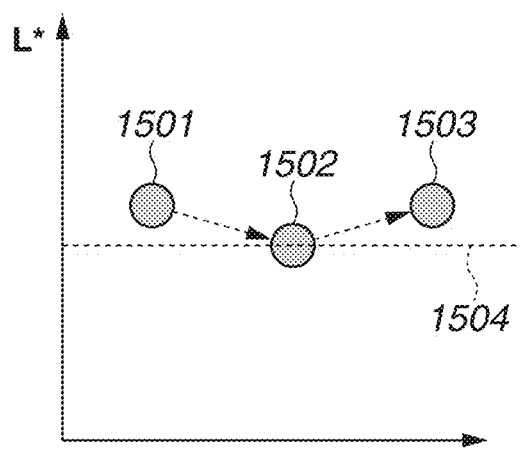
FIG. 15A is a diagram illustrating an example of tone discontinuity in the fourth exemplary embodiment.

In FIG. 15A, RGB values that are values of three grid points 1501 through 1503 are extracted, and the extracted RGB values are converted into lightness L, as similar to the grid points 603 through 605 in FIG. 6B. Lightness 1504 indicates lightness L of the grid point 1502. Moreover, the grid point 1502 is "a pure color".

Figure 15B:
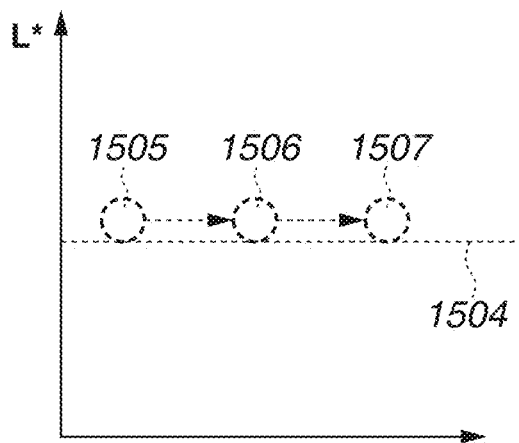
FIG. 15B is a diagram illustrating a state in which the tone discontinuity is corrected according to the fourth exemplary embodiment.

FIG. 15B illustrates grid points 1505 through 1507 that are acquired by performing the correction processing according to the first exemplary embodiment on the grid points 1501 through 1503 in FIG. 6A. With the effect of the first exemplary embodiment, changes in inclination between the grid points 1505 and 1506 and inclination between the grid points 1506 and 1507 are corrected. However, since the lightness L of the grid point 1506 of a pure color differs from the lightness 1504 which is the lightness L of the grid point 1502, corrected RGB values change. Hence, the pure color is no longer maintained after color separation.

Figure 15C:
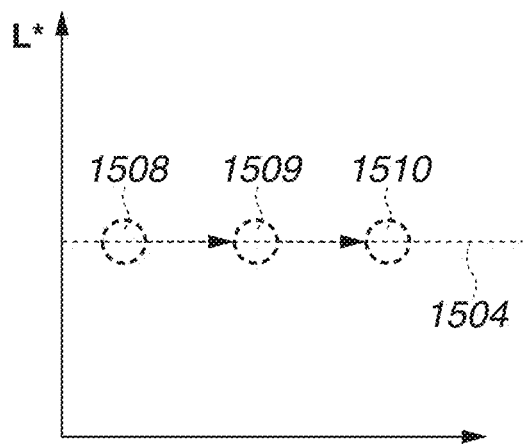
FIG. 15C is a diagram illustrating a state in which correction is made to maintain lightness of a pure color to the fourth exemplary embodiment.

FIG. 15C illustrates grid points 1508 through 1510 that are acquired by performing the correction processing according to the fourth exemplary embodiment on the grid points 1501 through 1503 in FIG. 15A. Similar to the first exemplary embodiment, changes in inclination are corrected. However, since the grid point 1502 is a pure color, the second-order difference 1404 to be used for correction becomes smaller or zero. Thus, in the corrected grid point 1509, the lightness 1504 is maintained. On the other hand, since each of the grid points 1501 and 1503 is not a pure color, the second-order difference 1404 to be used for correction is not reduced. Thus, second-order differences are corrected, and the grid points 1508 and 1510 are provided. With the effect of the fourth exemplary embodiment, changes in inclination between the grid points 1508 and 1509 and inclination between the grid points 1509 and 1510 are corrected with lightness of the grid point 1509 of pure color maintained.

In the present exemplary embodiment, a correction amount of the color defined as "pure color" is reduced. However, the processing may not necessarily be performed on all of pure colors. For example, a color that uses only Y can be defined as a pure color in data 1701 to maintain the pure color, and it is not necessarily necessary to define as a pure color a color that uses only C if it is unnecessary to maintain a pure color.

In the present exemplary embodiment, the same second-order difference correction processing is performed on all grid points of pure colors. However, different correction processing can be performed for each pure color. For example, a color that uses only Y can be set to have a second-order difference of zero, whereas pure colors other than the pure color using only Y can be processed such that a second-order difference becomes smaller.

According to the present exemplary embodiment, tone discontinuity can be prevented from occurring in an output value to be defined by a 3D-LUT for color conversion while color reproducibility of an image to be output is being maintained.

According to the present exemplary embodiment, moreover, the use of pure color information can prevent tone discontinuity while a pure color in an image to be output is being maintained.

Each of the first through third exemplary embodiments has been described using an example method by which output signal values defined by a 3D-LUT for color conversion are converted into lightness/chromaticity information, determination of whether tone discontinuity has occurred is made with respect to the lightness information, and the 3D-LUT is corrected based on a result of the determination.

However, in each of the first through third exemplary embodiments, since RGB values are corrected without consideration of color separation processing, a color material that is not used in the first place may be used after color separation, and a pure color may not be maintained. This may degrade graininess.

A fifth exemplary embodiment is made in view of such a circumstance and described using an example case where correction processing is performed using pure color information and threshold value information.

Figure 18:
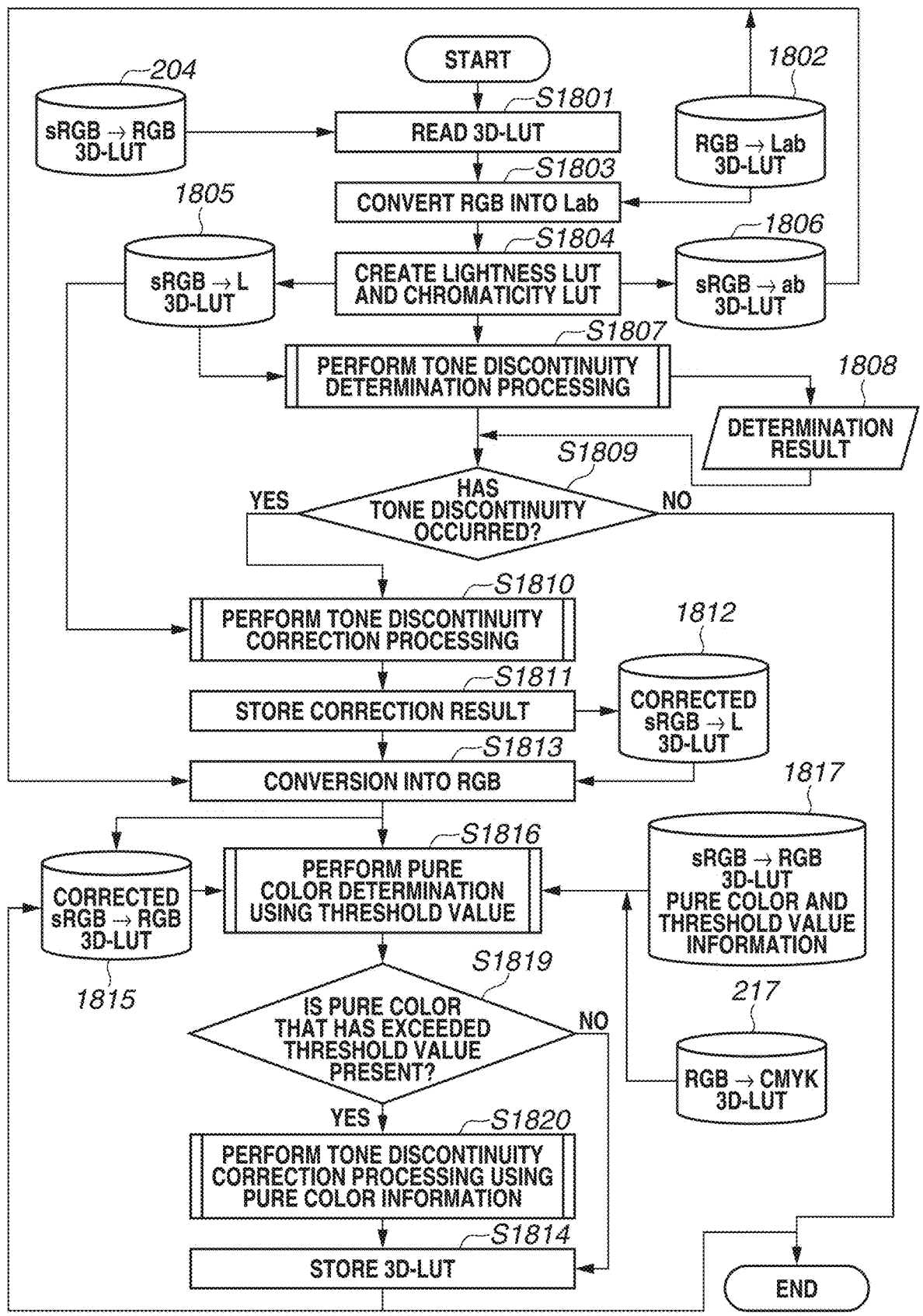
FIG. 18 is a flowchart of color conversion parameter correction processing according to the fifth exemplary embodiment.

Parameter creation processing according to the present exemplary embodiment is described with reference to FIG. 18.

The parameter creation processing is controlled by a parameter creation unit 121 of a PC 120. A processing described below is executed by a CPU 122 inside the PC 120, and created data is stored in a storage device 113 of an MFP 101. Since tone discontinuity determination processing is similar to that described above with reference to FIG. 4 according to the first exemplary embodiment, a description thereof is omitted.

Operations in steps S1801 through S1814 are similar to those in respective steps S301 through S314 of the flowchart in FIG. 3, descriptions thereof are omitted.

After RGB are converted in step S1813, the operation proceeds to step S1816. In step S1816, the CPU 122 uses a pure color and threshold value information 1817, a 3D-LUT 204 that converts sRGB into RGB, and a 3D-LUT 217 that converts RGB into CMYK to perform pure color determination processing using a threshold value. The pure color determination processing using a threshold value will be described in detail with reference to FIG. 19.

In step S1819, the CPU 122 determines whether a pure color that has exceeded a threshold value is present. If a pure color which has exceeded a threshold value is absent (NO in step S1819), the processing proceeds to step S1814. If a pure color which has exceeded a threshold value is present (YES in step S1819), the processing proceeds to step S1820 in which tone discontinuity correction processing using pure color information is performed. Since the operation in step S1820 is similar to that in step S1310 of the flowchart in FIG. 13 according to the fourth exemplary embodiment, a description thereof is omitted.

The pure color and threshold value information 1817 is described with reference to FIG. 17. In FIG. 17, data 1702 is an example of the pure color and threshold value information 1817 corresponding to the 3D-LUT 204, which converts sRGB into RGB. The data 1702 defines which color material provides a pure color corresponding to a combination of RGB signal values of input signals, and includes a threshold value. Herein, the threshold value represents a value indicating an excess of which signal value degrades graininess if a pure color is no longer maintained. In an example case where RGB values are 255, 255, and 102, a pure color is provided by a color material Y and a threshold value is 7. This indicates that graininess is degraded if, for example, a signal value of cyan that is not used in the first place (zero) exceeds 7. Herein, the threshold value can be defined for each color of CMYK. In the example in FIG. 17, RGB of output values are written. However, such RGB values may not necessarily be written. If a plurality of color materials is used, color material information is written with pure color information. For example, if a pure color in which only M and Y are used, "pure color MY" is written. In the present exemplary embodiment, a threshold value is set. However, a threshold value may be set to zero or may not necessarily be set. In such a case, a state in which a signal value that is not used in the first place (zero) exceeds zero indicates degradation in graininess.

Figure 19:
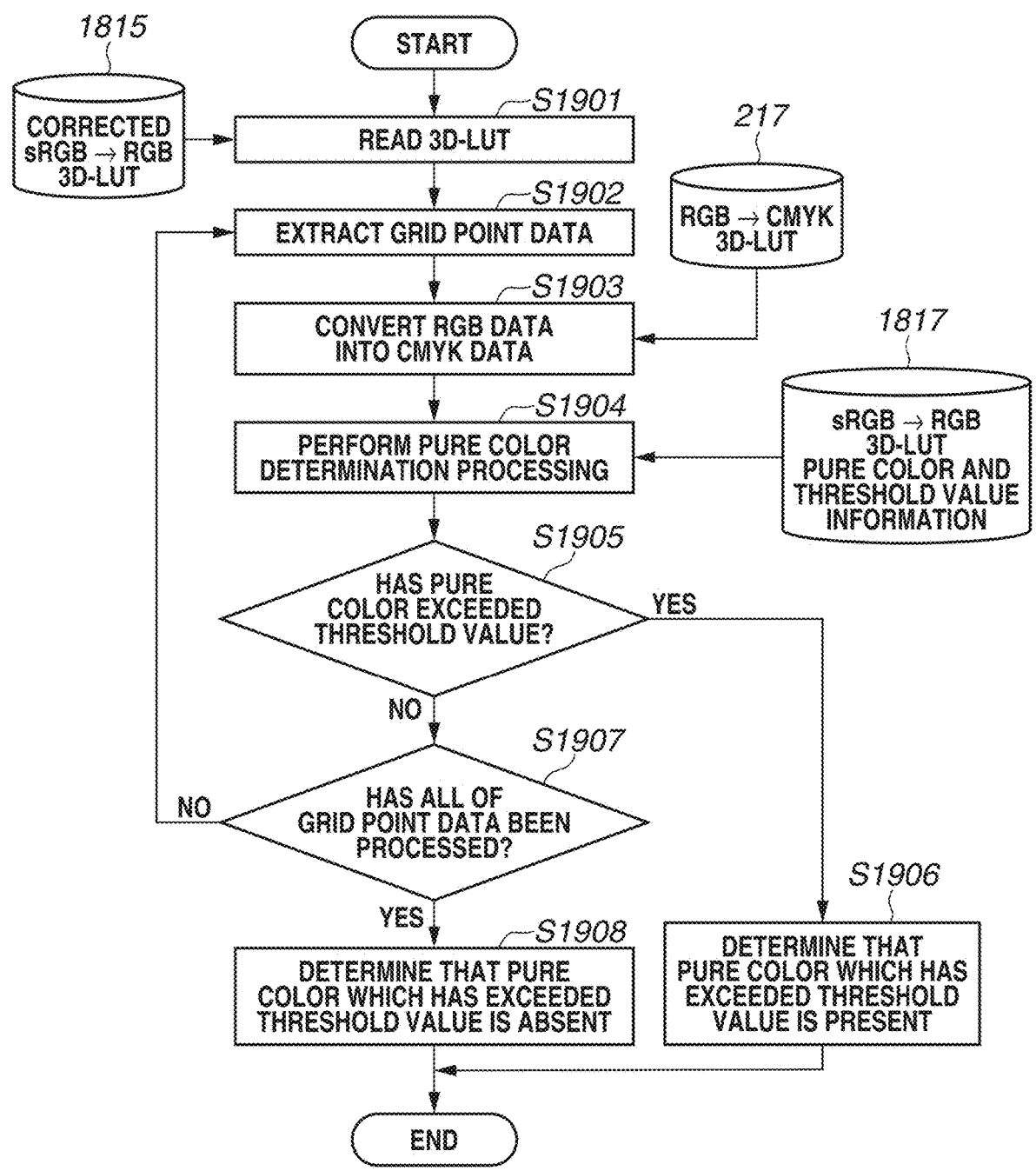
FIG. 19 is a flowchart of pure color determination processing using a threshold value according to the fifth exemplary embodiment.

The pure color determination processing using a threshold value is described with reference to FIG. 19.

In step S1901, the CPU 122 reads a 3D-LUT 1815 that converts corrected sRGB into RGB.

Subsequently, in step S1902, the CPU 122 extracts RGB values of a grid point to which attention is to be paid as a processing target, from the 3D-LUT 1815.

In step S1903, the CPU 122 uses the 3D-LUT 217, which converts RGB into CMYK, to convert the extracted RGB values of output values into CMYK values.

In step S1904, the CPU 122 uses the converted CMYK values and the pure color and threshold value information 1817 to perform pure color determination processing. Here, the CPU 122 uses the RGB values of the grid point extracted in step S1902 to make a comparison with the pure color information 1817, and determines whether the grid point is a pure color. In the example data 1702 in FIG. 17, the CPU 122 determines that the grid point is not a pure color if the RGB values are 170, 17, and 0. If the RGB values are 255, 255, and 102, the CPU 122 determines that the grid point is a pure color of Y. Subsequently, in step S1905, the CPU 122 uses the CMYK values calculated in step S1903 to calculate whether the pure color has exceeded the threshold value of 7.

In step S1905, if the pure color has exceeded the threshold value (YES in step S1905), the operation proceeds to step S1906. In step S1906, the CPU 122 determines that the pure color, which has exceeded the threshold value, is present.

If the pure color has not exceeded the threshold value (NO in step S1905), the operation proceeds to step S1907. In step S1907, the CPU 122 determines whether all of grid point data has been processed. If all the grid point data has not been processed yet (NO in step S1907), the operations in step S1902 and the subsequent steps are repeated.

If all the grid point data has been processed (YES in step S1907), the operation proceeds to step S1908. In step S1908, the CPU 122 determines that a pure color that has exceeded the threshold value is absent.

According to the present exemplary embodiment, tone discontinuity can be prevented from occurring in an output value to be defined by a 3D-LUT for color conversion while color reproducibility of an image to be output is being maintained.

Moreover, in the present exemplary embodiment, the use of pure color information can prevent tone discontinuity while a pure color in an image to be output is being maintained.

Each of the first through third exemplary embodiments has been described using an example method by which output signal values defined by a 3D-LUT for color conversion are converted into lightness/chromaticity information, determination of whether tone discontinuity has occurred is made with respect to the lightness information, and the 3D-LUT is corrected based on a result of the determination.

However, in each of the first through third exemplary embodiments, since RGB values are corrected without consideration of color separation processing, a color material that is not used in the first place may be used after color separation, and a pure color may not be maintained. This may degrade graininess.

A sixth exemplary embodiment is made in view of such a circumstance and described using an example case where processing for correcting RGB values is performed using pure color information after tone discontinuity correction processing.

Figure 20:
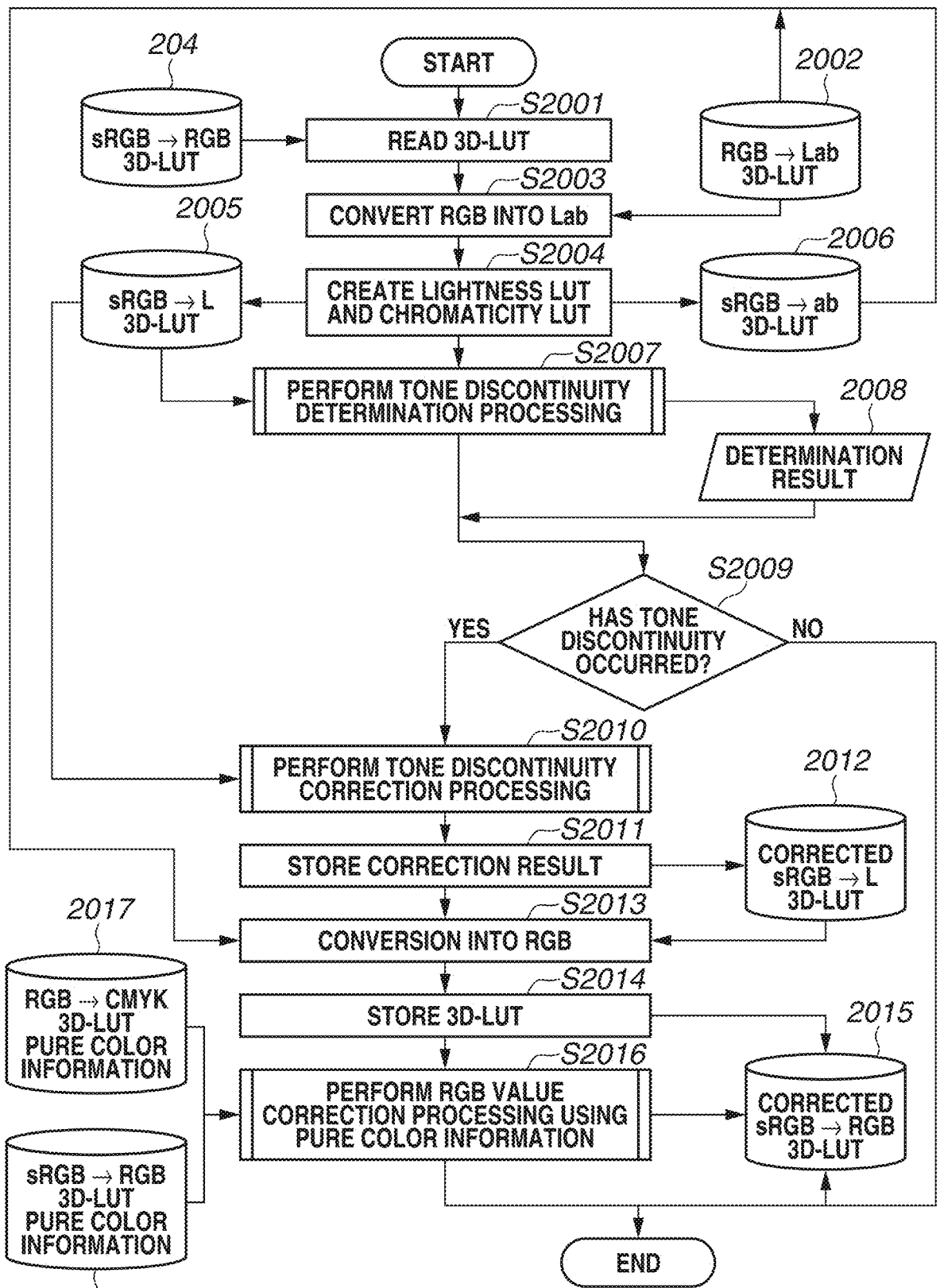
FIG. 20 is a flowchart of color conversion parameter correction processing according to the sixth exemplary embodiment.

Parameter creation processing according to the present exemplary embodiment is described with reference to FIG. 20.

The parameter creation processing is controlled by a parameter creation unit 121 of a PC 120. A processing described below is executed by a CPU 122 inside the PC 120, and created data is stored in a storage device 113 of an MFP 101. Moreover, since tone discontinuity determination processing is similar to that described above with reference to FIG. 4 according to the first exemplary embodiment, a description thereof is omitted.

Since operations in steps 2001 through S2014 are similar to those in respective steps S301 through S314 of the flowchart in FIG. 3, descriptions thereof are omitted.

After a 3D-LUT that converts corrected sRGB into RGB is stored in step S2014, the operation proceeds to step S2016. In step S2016, the CPU 122 performs RGB value correction processing using pure color information. Here, the CPU 122 uses pure color information 1317, and pure color information 2017 associated with a 3D-LUT that converts RGB into CMYK.

The pure color information 2017 is described with reference to FIG. 17. Data 1703 in FIG. 17 is an example of the pure color information 2017 corresponding to a 3D-LUT 217 that converts RGB into CMYK. The data 1703 defines whether a combination of RGB signal values of input signals provides a pure color. The example in FIG. 17 includes CMYK values to serve as output values. However, the CMYK values may not necessarily be included.

Figure 21:
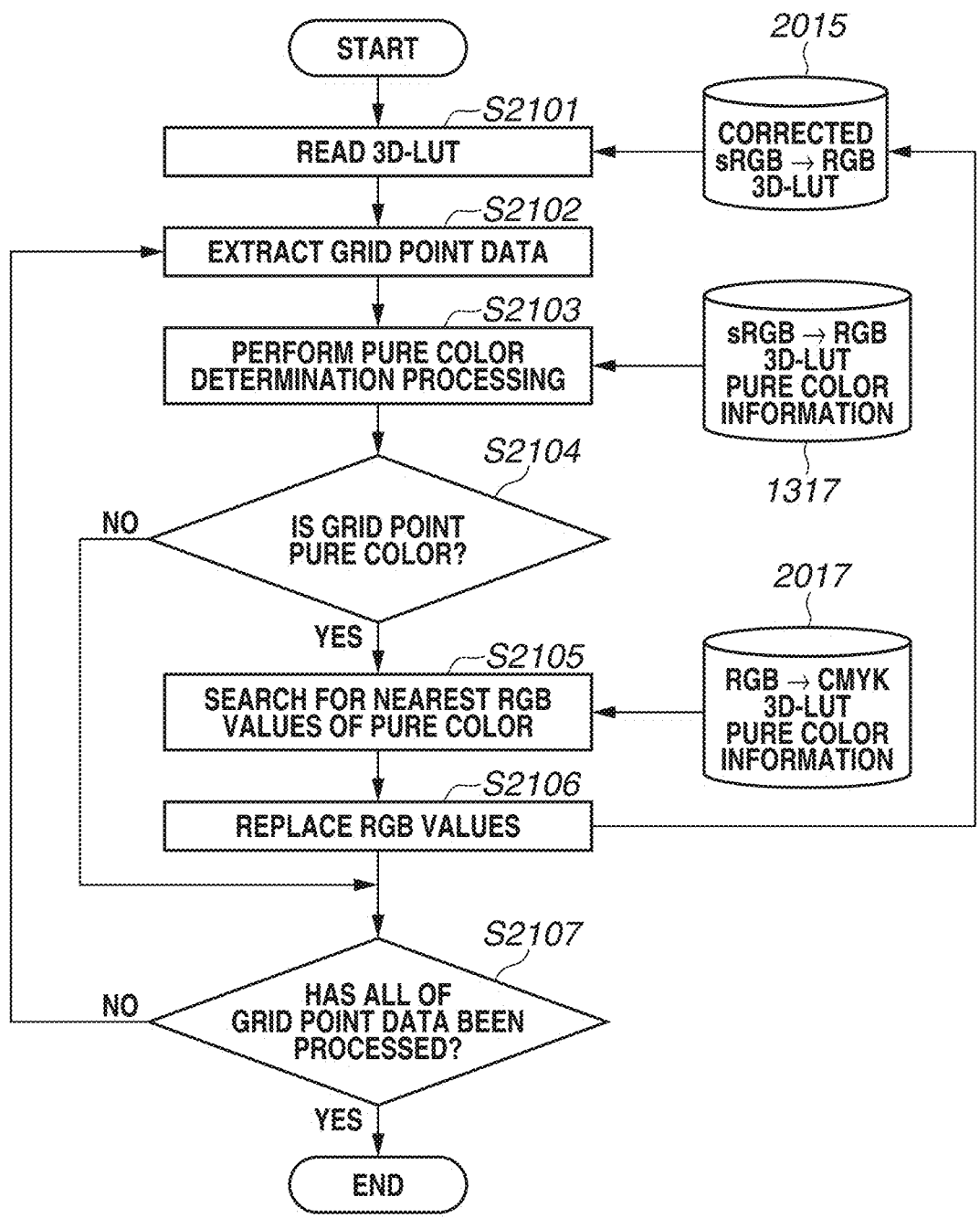
FIG. 21 is a flowchart of red, green, and blue (RGB) value correction processing using the pure color information according to the sixth exemplary embodiment.

The RGB value correction processing using pure color information is described with reference to FIG. 21.

In step S2101, the CPU 122 reads a 3D-LUT that converts corrected sRGB into RGB.

In step S2102, the CPU 122 extracts RGB values of a grid point to which attention is to be paid as a processing target, from the 3D-LUT 2015.

In step S2103, the CPU 122 performs pure color determination processing using the pure color information 1317. Here, the CPU 122 uses RGB values of input values of the grid point extracted in step S2102 to make a comparison with the pure color information 1317, and determines whether the grid point is a pure color.

In step S2104, if the CPU 122 determines that the grid point is a pure color (YES in step S2104), the operation proceeds to step S2105. In step S2105, the CPU 122 uses the pure color information 2017 to search for RGB values of a pure color nearest to the extracted RGB values.

A description is given using the data 1703 in FIG. 17 as an example. If the RGB values of output values extracted in step S2102 are 255, 253, and 236, the CPU 122 searches for nearest RGB values of the pure color, from the data 1703. In this case, the nearest RGB values of 255, 255, and 238 are searched.

In step S2106, the CPU 122 replaces the RGB values in the 3D-LUT 2015 with the searched RGB values.

In step S2104, if the CPU 122 determines that the grid point is not a pure color (NO in step S2104), the operation proceeds to step S2107. In step S2107, if the CPU 122 determines that all of grid point data has not been processed (NO in step S2107), the operations return to step S2102 and the subsequent steps. If the CPU 122 determines that all the grid point data has been processed (YES in step S2107), the operation ends.

According to the present exemplary embodiment, tone discontinuity can be prevented from occurring in an output value to be defined by a 3D-LUT for color conversion while color reproducibility of an image to be output is being maintained.

Moreover, in the present exemplary embodiment, the use of pure color information can prevent tone discontinuity while a pure color in an image to be output is being maintained.

According to each of the first through sixth exemplary embodiments, therefore, tone discontinuity can be prevented from occurring in an output value that is defined by a 3D-LUT to be used in color conversion processing and is output from the 3D-LUT while color reproducibility of an image to be output is being maintained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-201421, filed Oct. 17, 2017, and No. 2018-155609, filed Aug. 22, 2018, which are hereby incorporated by reference herein in their entirety.

What is claimed is:

1. An information processing apparatus that stores a first color conversion table that has device dependent RGB values at grid points of device independent values, wherein the grid points include a first grid point, a second grid point and a grid point of interest positioned at a center between and next to the first and second grid points, the information processing apparatus comprising:
at least one memory device that stores a set of instructions; and
at least one processor that executes the set of instructions to:
derive a first difference of the device dependent RGB values between the first grid point and the grid point of interest, and a second difference of the device dependent RGB values between the grid point of interest and the second grid point;
determine whether the device dependent RGB values at the grid point of interest are converted to only one color of CMYK in a second color conversion table used for converting device dependent RGB values to CMYK values;

adjust the device dependent RGB values at the grid point of interest in a case that the device dependent RGB values at the grid point of interest are determined not to be converted to the only one color so that a difference between the first and second differences is reduced, and not adjust the device dependent RGB values at the grid point of interest in a case that the device dependent RGB values at the grid point of interest are determined to be converted to the only one color; and generate a third color conversion table that has the adjusted device dependent RGB values at the grid point of interest.

2. A method of controlling an information processing apparatus that stores a first color conversion table that has device dependent RGB values at grid points of device independent values, wherein the grid points include a first grid point, a second grid point and a grid point of interest positioned at a center between and next to the first and second grid points, the method comprising:

deriving a first difference of the device dependent RGB values between the first grid point and the grid point of interest, and a second difference of the device dependent RGB values between the grid point of interest and the second grid point;

determining whether the device dependent RGB values at the grid point of interest are converted to only one color of CMYK in a second color conversion table used for converting device dependent RGB values to CMYK values;

adjusting the device dependent RGB values at the grid point of interest in a case that the device dependent RGB values at the grid point of interest are determined not to be converted to the only one color so that a difference between the first and second differences is reduced, and not adjust the device dependent RGB values at the grid point of interest in a case that the device dependent RGB values at the grid point of interest are determined to be converted to the only one color; and generating a third color conversion table that has the adjusted device dependent RGB values at the grid point of interest.

3. The information processing apparatus according to claim 1,
wherein the first difference is a difference of luminance values corresponding to the device dependent RGB values between the first grid point and the grid point of interest, and the second difference is a difference of luminance values corresponding to the device dependent RGB values between the grid point of interest and the second grid point.

4. The information processing apparatus according to claim 1,
wherein the at least one processor sets the grid points to the grid point of interest one by one, and performs the adjusting or the not adjusting on each set grid point of interest so that the third color conversion table is generated.

5. The information processing method according to claim 2,
wherein the first difference is a difference of luminance values corresponding to the device dependent RGB values between the first grid point and the grid point of interest, and the second difference is a difference of luminance values corresponding to the device dependent RGB values between the grid point of interest and the second grid point.

6. The information processing method according to claim 2,
wherein the grid points are set to the grid point of interest one by one, and performs the adjusting or the not adjusting on each set grid point of interest so that the third color conversion table is generated.

* * * * *